US010579265B2

(12) United States Patent
Andrew et al.

(10) Patent No.: US 10,579,265 B2
(45) Date of Patent: Mar. 3, 2020

(54) CLOUD-SYNCHRONIZED LOCAL STORAGE MANAGEMENT

(71) Applicant: Adobe Inc., San Jose, CA (US)

(72) Inventors: Jeffrey S. Andrew, Seattle, WA (US); Harrison W. Liu, Lake Forest Park, WA (US); Edward C. Wright, Minneapolis, MN (US)

(73) Assignee: Adobe Inc., San Jose, CA (US)

( * ) Notice: Subject to any disclaimer, the term of this patent is extended or adjusted under 35 U.S.C. 154(b) by 16 days.

(21) Appl. No.: 15/787,043

(22) Filed: Oct. 18, 2017

(65) Prior Publication Data

US 2019/0114086 A1    Apr. 18, 2019

(51) Int. Cl.
*G06F 12/00* (2006.01)
*G06F 13/00* (2006.01)
*G06F 3/06* (2006.01)

(52) U.S. Cl.
CPC .......... *G06F 3/0608* (2013.01); *G06F 3/0652* (2013.01); *G06F 3/0653* (2013.01); *G06F 3/0614* (2013.01); *G06F 3/0649* (2013.01)

(58) Field of Classification Search
CPC .... G06F 3/0608; G06F 3/0652; G06F 3/0653; G06F 3/0614; G06F 3/0649
USPC ........................................................ 711/154
See application file for complete search history.

(56) References Cited

U.S. PATENT DOCUMENTS

| 5,978,791 | A  | * | 11/1999 | Farber | ............... | G06F 17/30091 |
| | | | | | | 707/640 |
| 7,685,109 | B1 | * | 3/2010 | Ransil | ............... | G06F 17/30336 |
| | | | | | | 707/999.003 |
| 7,970,240 | B1 | | 6/2011 | Chao | | |
| 8,106,856 | B2 | | 1/2012 | Matas et al. | | |
| 8,209,540 | B2 | | 6/2012 | Brouwer | | |
| 8,305,355 | B2 | | 11/2012 | Matas et al. | | |
| 8,510,295 | B1 | | 8/2013 | Dayan | | |
| 9,069,469 | B2 | | 6/2015 | Bansal | | |
| 9,185,164 | B1 | | 11/2015 | Newhouse | | |
| 9,298,752 | B2 | | 3/2016 | Do | | |

(Continued)

OTHER PUBLICATIONS

Adobe(R) Photoshop(R) Lightroom(R) Cc Help, updated Jul. 26, 2016, Chapters 1-9.

(Continued)

*Primary Examiner* — Sheng Jen Tsai
(74) *Attorney, Agent, or Firm* — Finch & Maloney PLLC

(57) ABSTRACT

A digital asset management application stores a mixture of original and lossy assets in a user's local storage resource. This mixture is dynamically adjusted in response to usage patterns and availability of local storage. If local storage is limited, the number of original assets stored locally is reduced. If local storage resources are critically low, lossy assets are purged. A user's interactions with his/her digital assets are monitored, and assets that are perceived to be less important to a user are purged from local storage before assets that are perceived to be more important. An asset may be deemed to be "important" based on any number of relevant criteria, such as user selection, user rating, or user interaction. Coordinating asset allocation between local and cloud-based storage resources requires little or no active management on behalf of the user, thus transparently providing the user with the benefits of cloud storage.

19 Claims, 11 Drawing Sheets

(56) References Cited

U.S. PATENT DOCUMENTS

| | | | |
|---|---|---|---|
| 9,325,709 B2* | 4/2016 | Beckmann | H04L 63/10 |
| 9,344,433 B2 | 5/2016 | Adams | |
| 9,361,349 B1 | 6/2016 | Newhouse | |
| 9,413,824 B1 | 8/2016 | Newhouse | |
| 9,459,792 B2 | 10/2016 | Matas et al. | |
| 9,479,567 B1* | 10/2016 | Koorapati | G06F 17/30067 |
| 9,563,638 B2 | 2/2017 | Newhouse | |
| 9,565,232 B2 | 2/2017 | Chen | |
| 9,652,466 B2* | 5/2017 | Law | G06F 17/30598 |
| 9,716,753 B2 | 7/2017 | Piyush | |
| 2003/0083948 A1* | 5/2003 | Rodriguez | G06Q 30/06 |
| | | | 705/26.41 |
| 2006/0112015 A1* | 5/2006 | Chancellor | G06F 21/10 |
| | | | 705/51 |
| 2007/0168336 A1* | 7/2007 | Ransil | G06F 17/3089 |
| 2008/0205655 A1* | 8/2008 | Wilkins | G06Q 10/10 |
| | | | 380/279 |
| 2010/0174804 A1* | 7/2010 | Sonoyama | H04L 12/2812 |
| | | | 709/219 |
| 2010/0235366 A1* | 9/2010 | Andrew | G06F 17/30053 |
| | | | 707/752 |
| 2010/0293141 A1* | 11/2010 | Anand | G06F 8/71 |
| | | | 707/640 |
| 2014/0122451 A1 | 5/2014 | Euresti | |
| 2014/0122471 A1 | 5/2014 | Houston | |
| 2014/0187239 A1* | 7/2014 | Friend | H04L 29/08 |
| | | | 455/426.1 |
| 2014/0195516 A1 | 7/2014 | Balakrishnan | |
| 2015/0012528 A1* | 1/2015 | Kapadia | G06F 17/2288 |
| | | | 707/722 |
| 2015/0074222 A1* | 3/2015 | Liang | H04L 67/2842 |
| | | | 709/214 |
| 2016/0044054 A1* | 2/2016 | Stiansen | H04L 63/1416 |
| | | | 726/24 |
| 2017/0109370 A1 | 4/2017 | Newhouse | |
| 2017/0374186 A1* | 12/2017 | Velusamy | G06F 3/0619 |
| 2018/0190323 A1* | 7/2018 | de Jong | G11B 27/034 |
| 2018/0239556 A1* | 8/2018 | Cao | G06F 3/0647 |

OTHER PUBLICATIONS

Adobe(R) Photoshop(R) Lightroom(R) CC Help, updated Jul. 26, 2016, Chapters 10-17.

ICloud Photo Library, published Jul. 17, 2017, retrieved from <https://support.apple.com/en-us/HT204264> on Aug. 28, 2017.

Photos for Mac: Change where Photos Stores Your Files, published Mar. 30, 2017, retrieved from <https://support.apple.com/kb/PH21367?locale=en_US> on Aug. 28, 2017.

Welch, "How to Master Google Photos", The Verge, published Jun. 9, 2017, retrieved from <https://www.theverge.com/2017/6/9/15762170/google-photos-how-to-master> on Aug. 28, 2017.

"Change where your files are stored in Photos on Mac," retrieved from the Internet on Nov. 7, 2018 at: https://support.apple.com/guide/photos/change-where-photos-and-videos-are-stored-pht1ed9b966d/mac . 2 pages.

"Set up and use iCloud Photos," retrieved from the internet on Nov. 7, 2018 at: https://support.apple.com/en-us/HT204264. 4 pages.

* cited by examiner

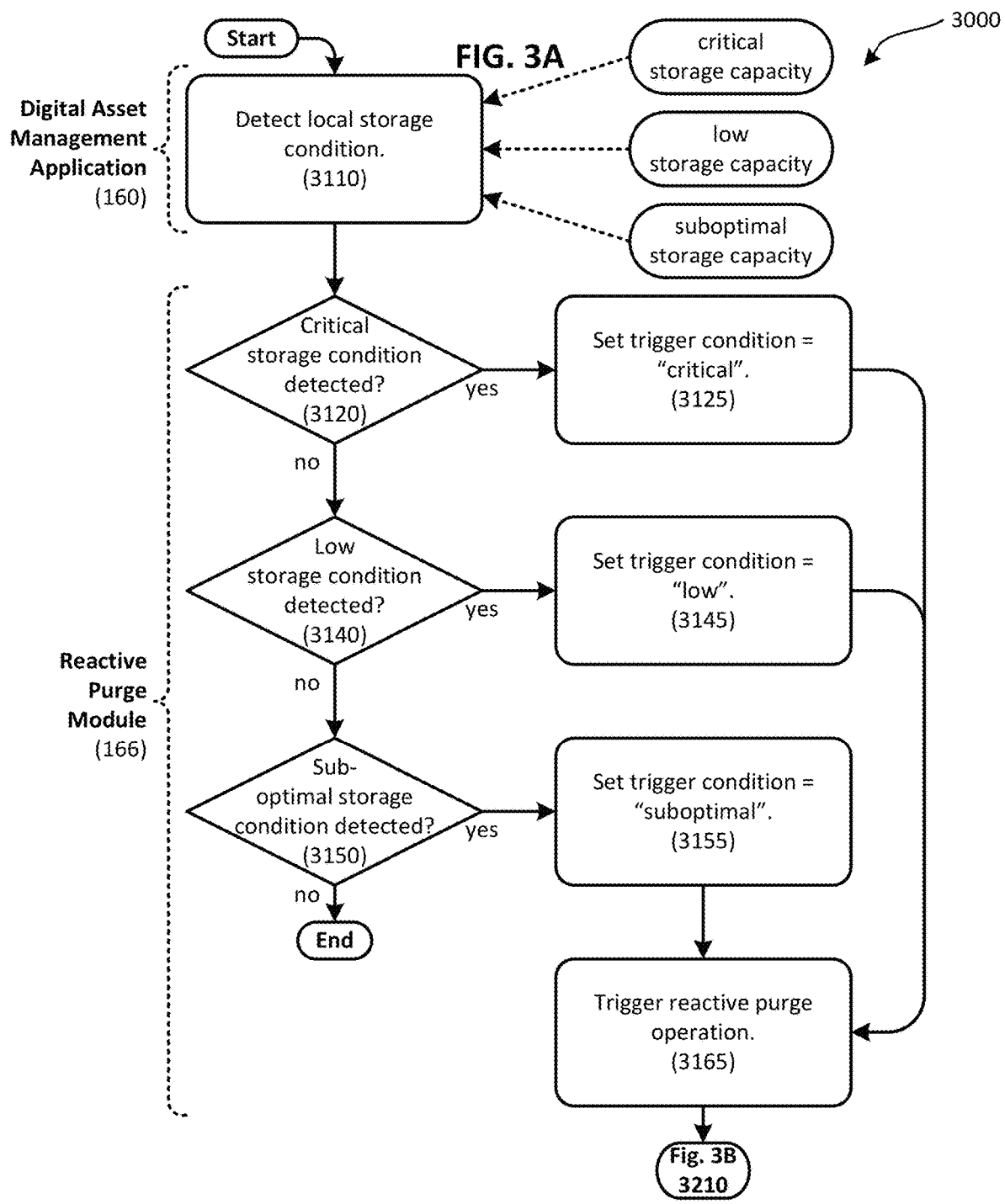

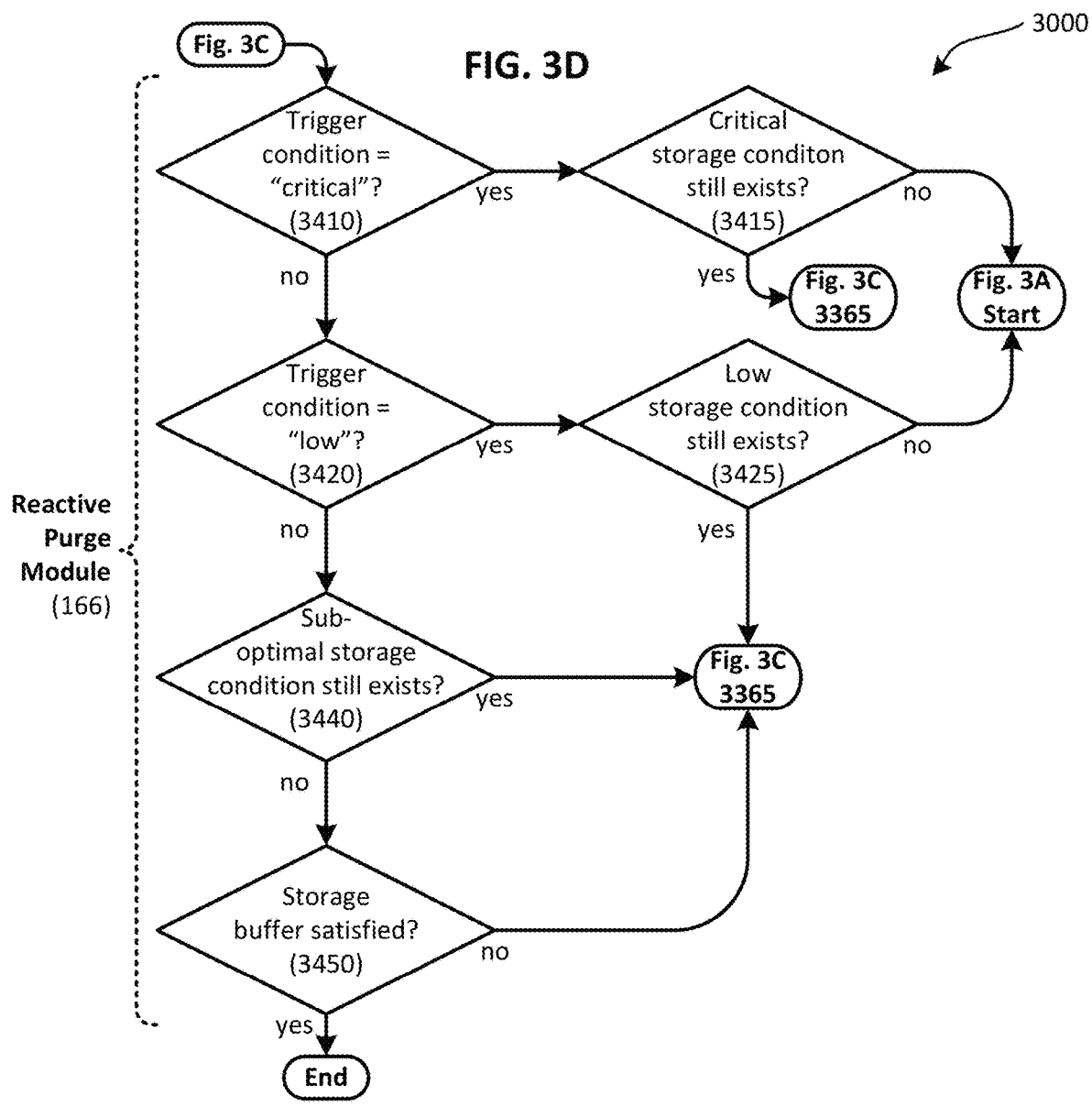

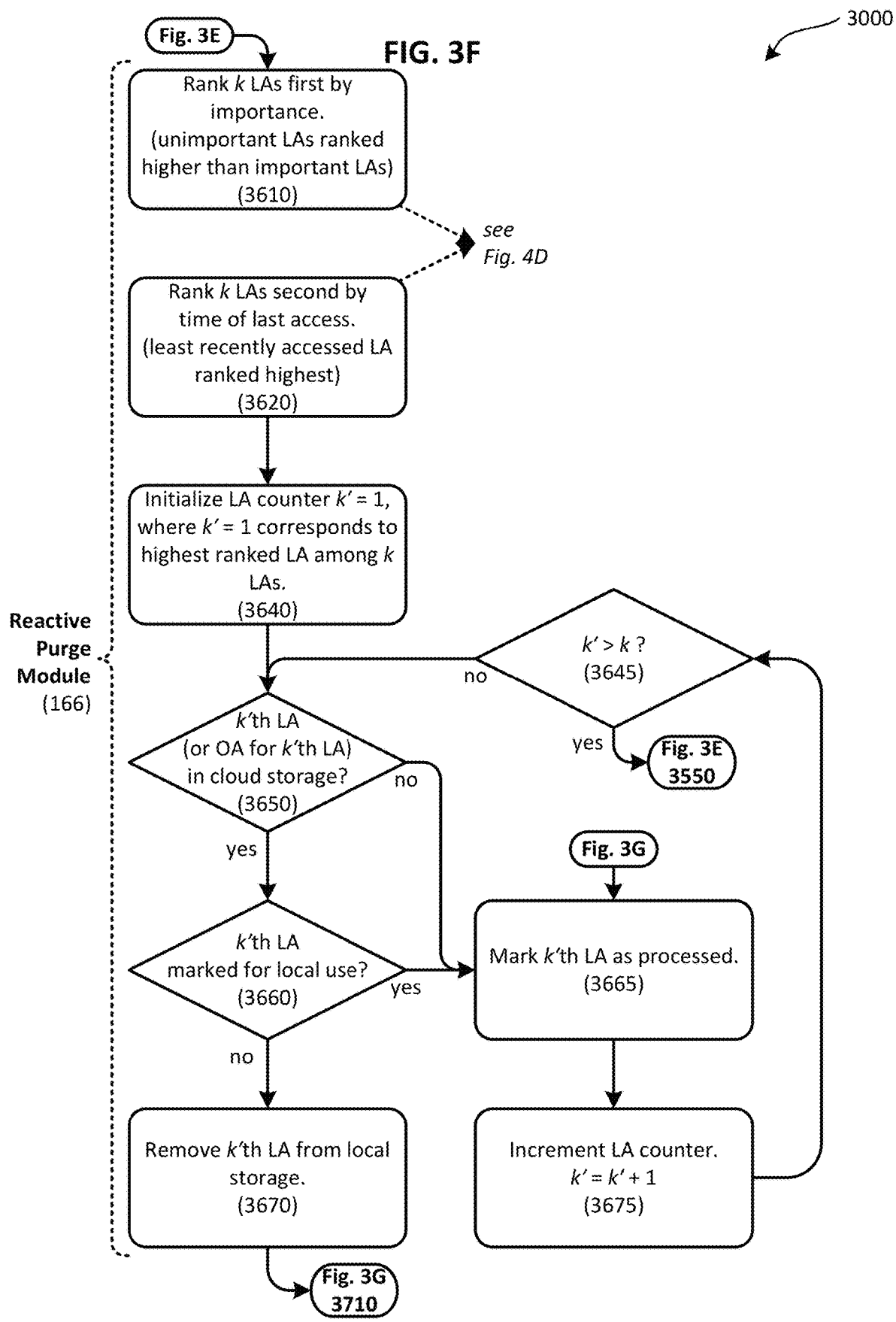

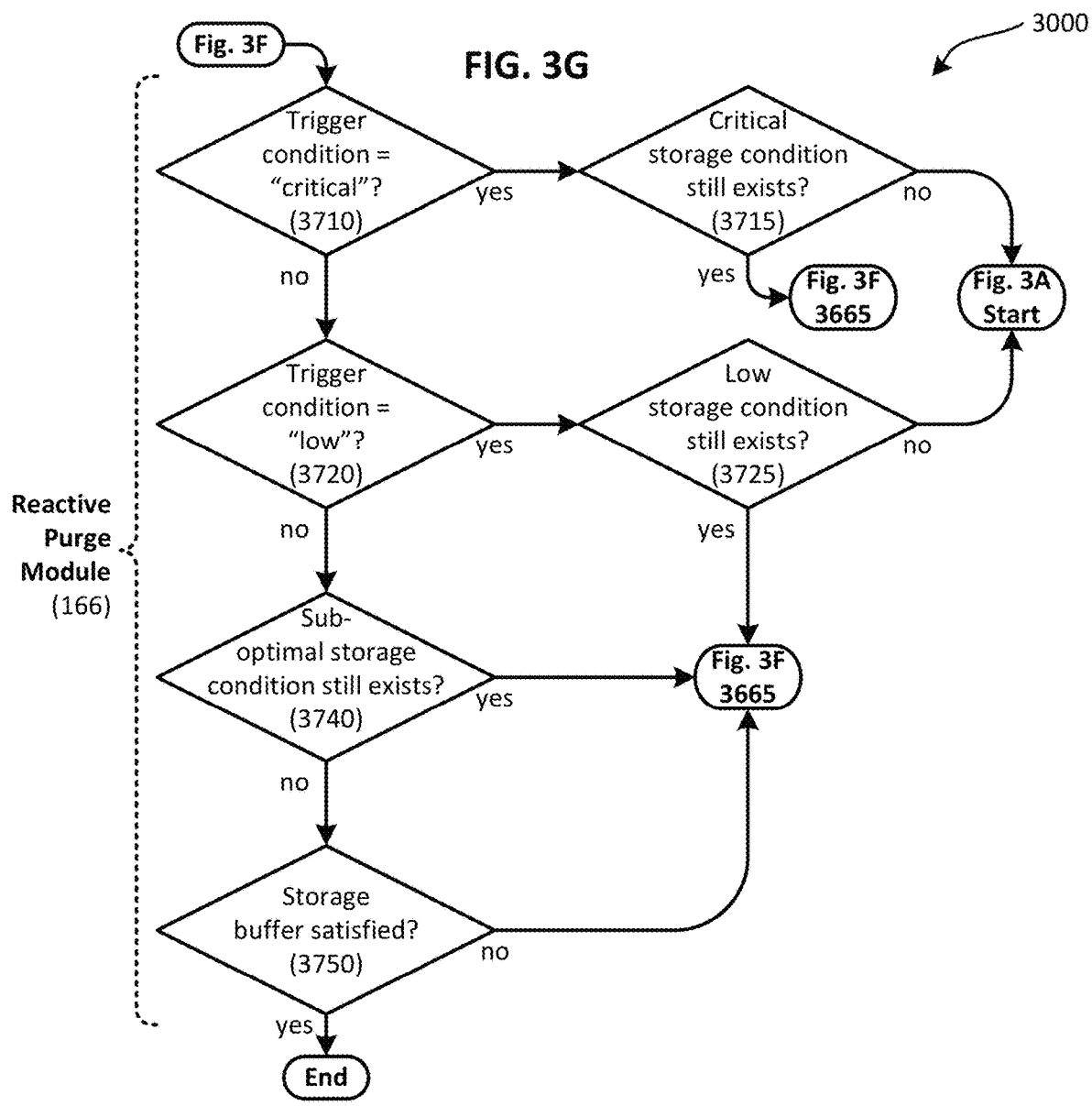

FIG. 4A list of assets in local storage 4100

| Asset ID | Last Access Date | Time | Imp't? |
|---|---|---|---|
| 1 | 27-Jun-1991 | 02:11:08 | no |
| 2 | 09-Apr-1994 | 21:32:19 | yes |
| 3 | 02-Oct-2003 | 14:36:23 | no |
| 4 | 24-May-2007 | 18:50:38 | no |
| 5 | 15-Oct-1994 | 01:59:47 | yes |
| 6 | 20-Mar-2022 | 13:46:44 | yes |
| 7 | 01-Apr-2019 | 06:04:42 | no |
| 8 | 27-Feb-2028 | 01:37:25 | yes |
| 9 | 13-Apr-1991 | 07:22:40 | yes |
| 10 | 04-Oct-2027 | 21:36:53 | yes |
| 11 | 19-Jul-2008 | 23:34:04 | no |
| 12 | 03-Feb-2019 | 10:41:40 | no |
| 13 | 01-Dec-2026 | 07:25:00 | no |
| 14 | 21-Aug-1990 | 06:26:55 | no |
| 15 | 06-Mar-1991 | 19:38:59 | yes |
| 16 | 24-Nov-1990 | 15:15:20 | yes |
| 17 | 21-Aug-1995 | 00:25:28 | yes |
| 18 | 06-Jun-2025 | 14:59:48 | yes |
| 19 | 21-Mar-2028 | 01:13:53 | yes |
| 20 | 02-Mar-2003 | 19:28:30 | yes |

FIG. 4B rank list by time of last access 4200

| Asset ID | Last Access Date | Time | Imp't? |
|---|---|---|---|
| 14 | 21-Aug-1990 | 06:26:55 | no |
| 16 | 24-Nov-1990 | 15:15:20 | yes |
| 15 | 06-Mar-1991 | 19:38:59 | yes |
| 9 | 13-Apr-1991 | 07:22:40 | yes |
| 1 | 27-Jun-1991 | 02:11:08 | no |
| 2 | 09-Apr-1994 | 21:32:19 | yes |
| 5 | 15-Oct-1994 | 01:59:47 | yes |
| 17 | 21-Aug-1995 | 00:25:28 | yes |
| 20 | 02-Mar-2003 | 19:28:30 | yes |
| 3 | 02-Oct-2003 | 14:36:23 | no |
| 4 | 24-May-2007 | 18:50:38 | no |
| 11 | 19-Jul-2008 | 23:34:04 | no |
| 12 | 03-Feb-2019 | 10:41:40 | no |
| 7 | 01-Apr-2019 | 06:04:42 | no |
| 6 | 20-Mar-2022 | 13:46:44 | yes |
| 18 | 06-Jun-2025 | 14:59:48 | yes |
| 13 | 01-Dec-2026 | 07:25:00 | no |
| 10 | 04-Oct-2027 | 21:36:53 | yes |
| 8 | 27-Feb-2028 | 01:37:25 | yes |
| 19 | 21-Mar-2028 | 01:13:53 | yes |

FIG. 4C identify j least recently accessed assets 4300

| Asset ID | Last Access Date | Time | Imp't? |
|---|---|---|---|
| 14 | 21-Aug-1990 | 06:26:55 | no |
| 16 | 24-Nov-1990 | 15:15:20 | yes |
| 15 | 06-Mar-1991 | 19:38:59 | yes |
| 9 | 13-Apr-1991 | 07:22:40 | yes |
| 1 | 27-Jun-1991 | 02:11:08 | no |
| 2 | 09-Apr-1994 | 21:32:19 | yes |
| 5 | 15-Oct-1994 | 01:59:47 | yes |
| 17 | 21-Aug-1995 | 00:25:28 | yes |
| 20 | 02-Mar-2003 | 19:28:30 | yes |
| 3 | 02-Oct-2003 | 14:36:23 | no |
| 4 | 24-May-2007 | 18:50:38 | no |
| 11 | 19-Jul-2008 | 23:34:04 | no |
| 12 | 03-Feb-2019 | 10:41:40 | no |
| 7 | 01-Apr-2019 | 06:04:42 | no |
| 6 | 20-Mar-2022 | 13:46:44 | yes |
| 18 | 06-Jun-2025 | 14:59:48 | yes |
| 13 | 01-Dec-2026 | 07:25:00 | no |
| 10 | 04-Oct-2027 | 21:36:53 | yes |
| 8 | 27-Feb-2028 | 01:37:25 | yes |
| 19 | 21-Mar-2028 | 01:13:53 | yes |

FIG. 4D rank j least recently accessed assets 1st by importance and 2nd by time of last access 4400

| Asset ID | Last Access Date | Time | Imp't? |
|---|---|---|---|
| 14 | 21-Aug-1990 | 06:26:55 | no |
| 1 | 27-Jun-1991 | 02:11:08 | no |
| 3 | 02-Oct-2003 | 14:36:23 | no |
| 4 | 24-May-2007 | 18:50:38 | no |
| 11 | 19-Jul-2008 | 23:34:04 | no |
| 12 | 03-Feb-2019 | 10:41:40 | no |
| 7 | 01-Apr-2019 | 06:04:42 | no |
| 16 | 24-Nov-1990 | 15:15:20 | yes |
| 15 | 06-Mar-1991 | 19:38:59 | yes |
| 9 | 13-Apr-1991 | 07:22:40 | yes |
| 2 | 09-Apr-1994 | 21:32:19 | yes |
| 5 | 15-Oct-1994 | 01:59:47 | yes |
| 17 | 21-Aug-1995 | 00:25:28 | yes |
| 20 | 02-Mar-2003 | 19:28:30 | yes |
| 6 | 20-Mar-2022 | 13:46:44 | yes |
| 18 | 06-Jun-2025 | 14:59:48 | yes |
| 13 | 01-Dec-2026 | 07:25:00 | no |
| 10 | 04-Oct-2027 | 21:36:53 | yes |
| 8 | 27-Feb-2028 | 01:37:25 | yes |
| 19 | 21-Mar-2028 | 01:13:53 | yes |

CLOUD-SYNCHRONIZED LOCAL STORAGE MANAGEMENT

FIELD OF THE DISCLOSURE

This disclosure relates generally to data management systems, and more specifically to techniques for efficiently, intelligently, and transparently coordinating storage of digital assets between a local storage device and a cloud-based storage resource.

BACKGROUND

Technological advances have resulted in a continual increase in the digital storage capacity of personal electronic devices such as desktop computers, smartphones, and tablet computers. To some extent, this added storage capacity has been offset by increasing device functionality and consumer use patterns. For example, as high definition cameras have become ubiquitous, consumers have come to expect a nearly unlimited ability to curate vast collections of high resolution photographs, record lengthy high definition videos, and generate other multimedia content that consumes significant storage resources. And as digital image processing solutions become more sophisticated and are adapted to mobile computing platforms, consumers also have an increased ability to create and manipulate digital content, thus further increasing the demand for storage resources. These trends, combined with the fact that computing devices are nearly always connected to the Internet, have led to the increasing use of cloud-based storage resources. In general, a cloud-based storage resource can be understood as providing data storage in a distributed network of storage devices rather than on one specific device. Storing data in a cloud-based storage resource, which is often colloquially referred to as storing data "in the cloud", enables the stored data to be accessed via nearly any device capable of connecting to the resource. Cloud-based storage resources therefore provide users with a convenient and scalable storage solution that reduces the extent to which a user needs to be cognizant of local storage resource limitations. Storing data in the cloud also provides a convenient way to share data amongst multiple users and across multiple devices, thus facilitating workgroup collaboration and device sharing. As more consumers turn to cloud-based storage solutions, systems that transparently maintain synchronization of local and cloud-based file systems have become increasingly important. Cloud-based storage resources are also sometimes referred to as "remote" storage resources.

BRIEF DESCRIPTION OF THE DRAWINGS

FIGS. 3A through 3G comprise a flowchart illustrating an example technique for performing a reactive purge of locally stored assets in response to a detected local storage condition.

FIG. 4A illustrates an example listing of assets, each of which is identified by an asset identifier, is associated with a last access date/time, and is further associated with an importance tag indicating whether or not the listed asset is deemed to be important to a user.

FIG. 4B illustrates an example listing of assets, wherein the least recently accessed asset is ranked highest.

FIG. 4C illustrates an example of a ranked listing of assets, wherein the least recently accessed asset is ranked highest, and wherein a subset of fifteen least recently accessed assets are identified.

FIG. 4D illustrates an example of a ranked listing of assets wherein a subset of fifteen least recently accessed assets are identified, and wherein said subset is ranked first by importance and second by time of last access.

DETAILED DESCRIPTION

Figure 1:
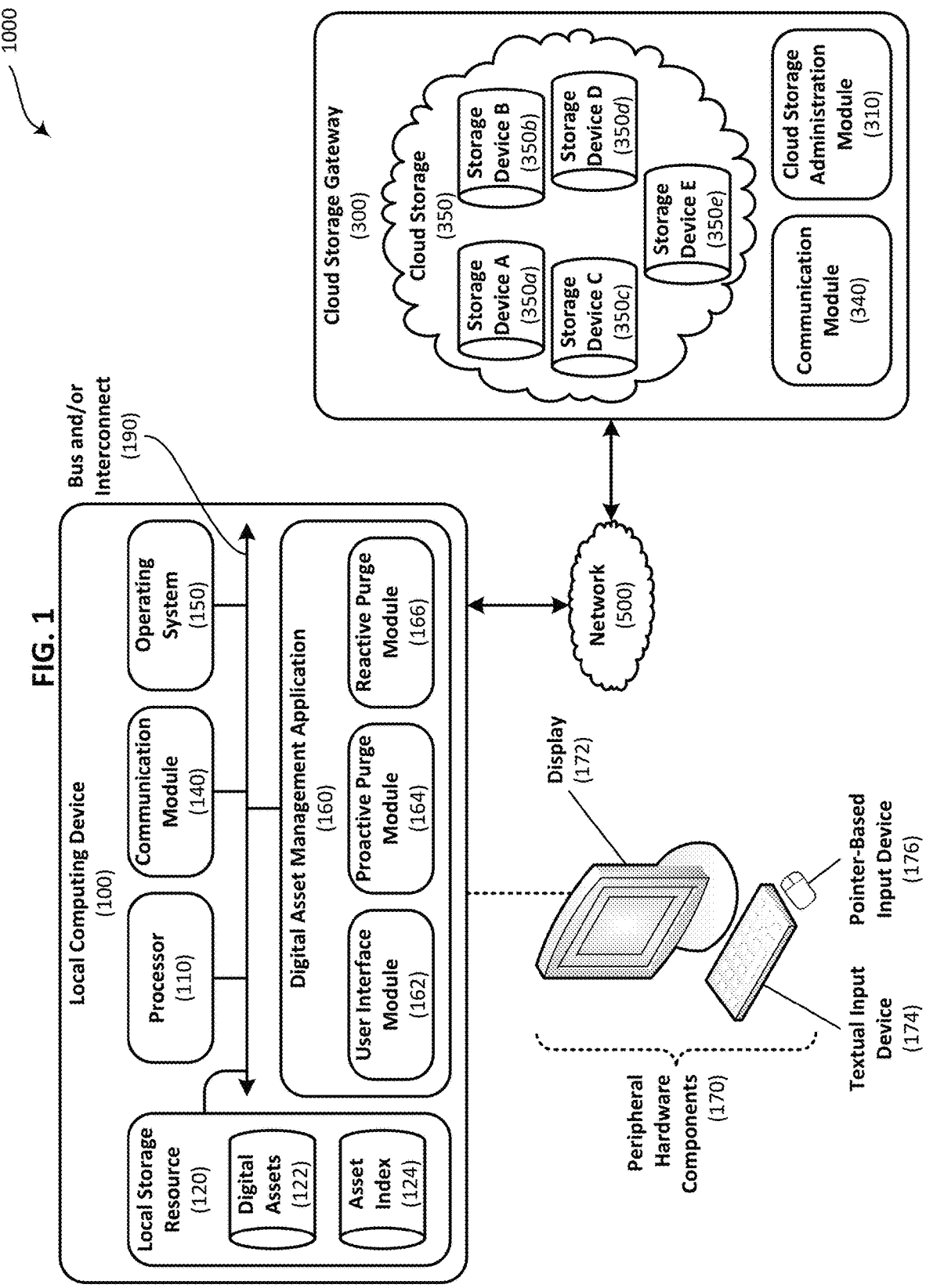
FIG. 1 is a block diagram schematically illustrating selected components of an example embodiment of a cloud-synchronized local storage management framework that efficiently, intelligently, and transparently coordinates storage of digital assets between a local storage device and a cloud-based storage resource.

As noted above, consumers are increasingly turning to cloud-based storage resources to address the continually growing data storage demands associated modern computing devices and software applications. While cloud-based storage resources provide a convenient and scalable storage solution that makes it easy to collaborate with others and share devices, using these resources presents challenges that are unique to the realm of distributed data storage. For example, consumers who leverage cloud-based storage resources expect the synchronization of assets between local and remote storage systems to be seamless and transparent. Consumers also expect latency associated with accessing remotely stored assets to be minimal. Ideally, consumers should be able to reap all of the benefits of cloud storage—including accessibility, capacity, redundancy, and reliability—without needing to actively coordinate how individual assets are allocated between local and remote storage resources. Indeed, many users would prefer that a cloud-based storage resource operate with complete transparency, such that they can interact with their digital assets as they wish, without regard to whether such assets are stored locally or remotely. These are challenges that do not arise in the context of a conventional filing system for paper documents, or even an electronic storage system hosted by a single device. If cloud-based storage resources are to be widely adopted, consumer expectations with respect to transparency, latency, and ease of use will be met with solutions that are specifically tailed to the realm of distributed data storage.

Efficient coordination of local and remote storage resources is especially useful in the context of managing a collection of digital photographs. Digital photographs are often stored in both an "original" format that preserves the original full resolution of the photograph, as well as in a "lossy" (also referred to as "compressed" or "thumbnail") format that consumes minimal storage space at the expense of a degradation in photograph quality. Thus efficient management of a limited local storage resource may involve purging original assets from the local storage resource if such assets are still available in cloud storage, and also if corresponding lossy assets remain available locally. It may also involve relying on cloud storage to store assets that are less important to a user, and thus less likely to be accessed by the user. This will help reduce the frequency of accessing cloud storage, thereby reducing latency and increasing transparency from the user's perspective. Thus efficient coordination of local and remote storage resources may involve observing and responding to a user's interactions with a collection of assets.

Thus, and in accordance with the foregoing, disclosed herein are improved techniques for efficiently, intelligently, and transparently coordinating storage of digital assets between a local storage device and a cloud-based storage resource. In particular, a digital asset management application is used to intelligently manage cloud-synchronized local copies of a user's digital assets. In certain implementations, the digital asset management application stores a mixture of both original assets and lossy assets in a user's local storage resource. This mixture is dynamically adjusted in response to usage patterns and availability of local storage. For example, if local storage resources are limited, the number of original assets stored locally can be reduced or eliminated. If local storage resources are critically low, even lossy assets can be purged. In certain implementations, a user's interactions with his/her digital assets are monitored, and assets that are perceived to be less important to a user are purged from local storage before assets that are perceived to be more important. As will be described in greater detail herein, an asset may be deemed to be "important" based on any number of relevant criteria, such as user selection, user rating, or user interaction. Coordinating asset allocation between local and cloud-based storage resources requires little or no active management on behalf of the end user, thus transparently providing the user with the benefits of cloud storage. In some implementations, the user simply sets a target local storage footprint upon which the digital asset management application optimizes asset allocation.

As noted above, one aspect of efficient and intelligent coordination of local and cloud-based storage resources involves purging from local storage those digital assets which are observed to be less important to a user. This purging of assets can be accomplished in a two-stage framework that involves purging assets both proactively and reactively. In such implementations, assets can be proactively purged periodically, such as every 24 hours or every time the digital asset management application is launched. On the other hand, assets can also be purged in response to detection of certain conditions specifically relating to a managed local storage resource, such as when available storage drops below certain threshold values (for example, below two gigabytes or below five gigabytes), or when the locally stored assets are consuming more than a specified percentage of available local storage capacity (for example, more than 25% of available local storage). The specific assets which are purged may depend on the type of purge operation being performed (proactive or reactive), and in the case of a reactive purge operation, may further depend on the detected condition which triggered the purge and other user-defined configuration settings, such as the activation of "Lite Mode", which will be described in turn.

The cloud-synchronized local storage management techniques that are disclosed herein provide specific solutions for efficiently, intelligently, and transparently coordinating storage of digital assets between a local storage device and a cloud-based storage resource. These solutions are rooted in computer technology to overcome problems specifically arising in the realm of computer-implemented digital storage systems. For example, certain of the techniques disclosed herein advantageously observe usage patterns in determining how to allocate assets between local and remote storage. These techniques can also automatically respond to detected conditions associated with a local storage device by adjusting how assets are allocated between local and remote storage. Such automated coordination of asset allocation is especially advantageous in the context of managing a collection of digital photographs and/or videos where the efficiency of the storage framework further relies on making intelligent decisions with respect to coordination of original and lossy asset storage. This is a consideration that does not arise in the context of a conventional filing system for paper documents, or even an electronic storage system hosted by a single device.

Even where local storage is limited, the techniques disclosed herein can advantageously provide a user with quick access to high quality versions of important and/or frequently used assets while also providing cloud-based access to lossy versions of an entire collection of assets. This can significantly reduce the volume of data transmitted to and from a cloud-based storage resource, thereby reducing latency and increasing transparency from a user's perspective. It also reduces, in a user-configurable way, the extent to which local storage resources are devoted to the user's collection of assets. In certain implementations the digital asset management application tracks each locally-stored asset using a path that is relative to a globally unique identifier (GUID) associated with the logical volume on which the asset is stored. This advantageously enables a user to modify volume names or drive letters without affecting system operability, thus making it easy to move and administer cloud-synchronized local storage resources. For example, it reduces the likelihood that a user is confronted with broken links and missing files when a collection of assets is moved to a new local storage location.

As used herein, the terms "original" and "lossy" are used to describe storage formats for digital assets. In particular, an "original asset" refers to an asset stored in a way that retains a relatively higher degree of fidelity to, or that provides an exact copy of, an original or source. Examples of original assets include photographs, video recordings, and audio recordings which have not been compressed or otherwise processed in a way that reduces quality. Original assets may also be referred to as being "uncompressed". On the other hand, a "lossy asset" refers to an asset that is stored in a way that results in a relatively lower degree of fidelity to an original or source. Examples of lossy assets include photographs, video recordings, and audio recordings which have been compressed or otherwise processed in a way that reduces quality. Such processing is typically performed to reduce the amount of digital storage required to save the asset. In the context of video recordings, an original asset may be understood as a full fidelity version of the video, while a lossy asset may be understood as a representative frame of the video, perhaps stored with reduced resolution. Lossy assets may also be referred to as being "compressed" or "thumbnail" versions of an original asset.

As used herein, the term "asset" refers broadly to information intended for consumption by a user, such as when the asset is displayed using a display device, played using a playback device, or otherwise rendered. Examples of assets include photographs, video recordings, audio recordings, multimedia content, and documents. Assets often also include information that is not specifically intended to be rendered, and therefore the term should also be understood as encompassing embedded metadata that defines compression algorithms, permissions, usage history, and the like. Digital assets are encoded in binary digits (for example, zeroes and ones) that are stored in an electronic container often referred to as a "file". A single file may include multiple distinct digital assets. In the context of applications involving digital computers, the terms "asset" and "digital asset" are often used interchangeably.

As used herein, the term "cloud-based storage" refers, in addition to its ordinary meaning, to a computing device or resource that provides data storage in a distributed network of storage devices rather than on one specific device. However, notwithstanding the fact that it comprises a large number of distributed resources, cloud-based storage acts as—and therefore can be interacted with as—a single storage device. The data stored in cloud-based storage can be logically organized into a plurality of "data records" which may, for example, correspond to individual assets, files, objects, or other logical containers. Cloud-based storage is typically owned and administered by a host that is responsible for keeping data available and accessible, although larger organizational users may build and administer their own cloud-based storage. Regardless of the particular administrative model implemented, users access the services provided by cloud-based storage via an application programming interface (API) or via applications that use the API, such as a cloud storage desktop application, a cloud sever gateway, or a web-based content management system. In many cases the same host that manages the cloud-based storage also provides the API or user interface through which the storage resources can be leveraged. Cloud-based storage is therefore often understood as being implemented in a client-server computing environment, wherein the cloud-based storage is provided by a server and the local computing device acts as a client. Commercially available cloud-based storage resources include Google Drive (Google Inc., Mountain View, Calif.), iCloud (Apple Inc., Cupertino, Calif.), and OneDrive (Microsoft Corporation, Redmond, Wash.). The terms "cloud-based storage", "cloud-based storage resource", and "cloud storage" are often used interchangeably.

System Architecture

FIG. 1 is a block diagram schematically illustrating selected components of an example embodiment of a cloud-synchronized local storage management framework 1000 that efficiently, intelligently, and transparently coordinates storage of digital assets between a local computing device 100 and cloud storage 350 that is accessible via a cloud storage gateway 300. More specifically, local computing device 100 includes a digital asset management application 160 that selectively purges digital assets from a local storage resource 120 so as to maintain local storage consumption in conformance with specified usage guidelines. In certain implementations local computing device 100 and cloud storage gateway 300 communicate with each other via a network 500. Other embodiments may have fewer or more communication paths, networks, subcomponents, and/or resources depending on the granularity of a particular implementation. Additionally, while one local computing device and one cloud storage gateway are illustrated in FIG. 1 for clarity, it will be appreciated that, in general, tens, hundreds, thousands, or more cloud storage gateways can be configured to service the storage needs of an even larger number of local computing devices. Thus the embodiments described and illustrated herein are not intended to be limited to the provision or exclusion of any particular services and/or resources.

Local computing device 100 may comprise, for example, one or more devices selected from a desktop computer, a laptop computer, a workstation, an enterprise-class server computer, a handheld computer, a tablet computer, a cellular telephone, a smartphone, a set-top box, a television, or any other suitable computing device. A combination of different devices may be used in certain embodiments. Local computing device 100 includes one or more software modules configured to implement certain of the functionalities disclosed herein as well as hardware capable of enabling such implementation. The hardware may include, but is not limited to, a processor 110, the aforementioned local storage resource 120, and a communication module 140. A bus and/or interconnect 190 is also provided to allow for inter- and intra-device communications using, for example, communication module 140. The hardware may also include integrated and/or peripheral hardware components 170 such as one or more of a display 172, a textual input device 174 (such as a keyboard), a pointer-based input device 176 (such as a mouse), a microphone, a camera, and any other suitable components that enable a user to control the operation of, and interact with, local computing device 100. The implementing software, on the other hand, may include components such as an operating system 150 and the aforementioned digital asset management application 160. Other components and functionalities not reflected in the schematic block diagram of FIG. 1 will be apparent in light of this disclosure, and it will be appreciated that the present disclosure is not intended to be limited to any particular configuration of hardware and software.

A single user may connect to cloud storage gateway 300 using a variety of different local computing devices, for example, using a home computer, a work computer, a tablet computer, and a smartphone. Cloud storage gateway 300 thus enables the user to access his/her data using a number of different devices. Likewise, a single local computing device can be used by multiple users to connect to cloud storage gateway 300. Thus in certain embodiments local computing device 100 is capable of partitioning a resource, such as local storage resource 120, such that it can be shared by multiple users. A particular user's digital assets can then be stored on his/her designated memory partition.

Referring to the hardware components that comprise the example local computing device 100 illustrated in FIG. 1, processor 110 can be any suitable processor, and may include one or more coprocessors or controllers, such as an audio processor or a graphics processing unit, to assist in processing operations of local computing device 100. Communication module 140 can be any appropriate network chip or chipset which allows for wired and/or wireless communication via network 500 to cloud storage gateway 300.

Local storage resource 120 can be implemented using any suitable type of digital storage, such as one or more of a disk drive, a universal serial bus drive, flash memory, and/or random access memory. In an implementation wherein local computing device 100 comprises a desktop computer, local storage resource 120 comprises a hard disc drive that hosts a local file system in which digital assets 122 are stored. In an implementation wherein local computing device 100 comprises a smartphone, local storage resource 120 comprises random access memory in which digital assets 122 are stored. As illustrated in FIG. 1, local storage resource 120 can be configured to store not only digital assets 122, but also to store an asset index 124 that provides a record of which assets and asset types are replicated in cloud storage 350. This enables local computing device 100 to purge assets from local storage on the basis of those assets also being stored in cloud storage 350. The presence of local asset index 124 allows such purge operations to occur even when local computing device 100 is unable to communicate with cloud storage gateway 300. In some cases asset index 124 is generated, maintained, and administered by digital asset management application 160.

In terms of the software components that comprise local computing device 100, operating system 150 may comprise any suitable operating system, such as Google Android (Google Inc., Mountain View, Calif.), Microsoft Windows (Microsoft Corporation, Redmond, Wash.), or Apple OS X (Apple Inc., Cupertino, Calif.). As will be appreciated in light of this disclosure, the techniques described herein can be implemented without regard to the particular operating system provided in conjunction with local computing device 100, and therefore may also be implemented using any suitable existing or subsequently developed platform.

The implementing software may also include digital asset management application 160, which can be configured to efficiently, intelligently, and transparently coordinate storage of digital assets between local storage device 100 and cloud storage 350. In some implementations digital asset management application 160 is implemented as a standalone application dedicated to providing the various functionalities described herein. In other implementations digital asset management application 160 forms part of a software application that allows users to manipulate the managed assets. For example, in one implementation a software application that provides digital image viewing, retouching, and/or doctoring functionality also provides the organizational and file management functionality described herein. Such a combination eliminates or reduces the need for a user to be cognizant of local storage limitations with manipulating individual images that form part of a larger collection. One example implementation of digital asset management application 160 is LIGHTROOM® (Adobe Systems Incorporated, San Jose, Calif.).

As illustrated in FIG. 1, in an example embodiment digital asset management application 160 comprises a user interface module 162, a proactive purge module 164, and a reactive purge module 166. Each of these modules is implemented using a non-transitory computer readable medium (such as provided by local storage resource 120) and one or more processors (such as processor 110) of a computing apparatus (such as local computing device 100). In such embodiments the non-transitory computer readable medium stores program instructions that are executable by the one or more processors to cause local computing device 100 to perform certain aspects of the techniques described herein. While FIG. 1 illustrates three particular modules that form part of digital asset management application 160, it will be appreciated that more or fewer modules can be used in other embodiments depending on the granularity of implementation.

For example, in certain embodiments user interface module 162 enables a user to manipulate various configuration settings that control how much of local storage resource 120 is dedicated to storing digital assets 122. This can be defined in terms of an absolute quantity of storage capacity (for example, expressed in gigabytes), or in terms of a proportion of currently available storage capacity (for example, as a percentage). User interface module 162 can provide access to other settings, such as asset storage locations and minimum storage capacity thresholds that, when triggered, cause certain purge operations to be invoked, as will be described in turn. User interface module 162 can also be configured to receive input that specifies certain assets as "important", such as through the use of a "favorite" or "store locally" selector. In certain implementations such selections can be used to force certain assets to be stored locally in an original format.

Proactive purge module 164 can be configured to periodically purge certain assets from local storage resource 120. For example, in one embodiment a proactive purge operation removes from local storage original assets which (a) are evaluated as not being important (that is, "unimportant") to a user; (b) are also stored in cloud storage 350; and (c) have a corresponding locally-stored lossy version. The proactive purge operation can be configured to purge additional or alternative assets in other embodiments. Regardless of which assets are actually purged, the proactive purge operation can be invoked periodically, such as every time digital asset management application 160 is launched and every 24 hours thereafter. In such embodiments the proactive purge operation is invoked without regard to the amount of available storage capacity at local storage resource 120. The schedule on which proactive purge operations are invoked is optionally user-configurable via user interface module 162. In some cases a proactive purge operation is invoked after a certain period of inactivity. Periodic execution of the proactive purge operation reduces the amount of local storage resource 120 dedicated to storing digital assets 122, and therefore also reduces the frequency at which more aggressive purge operations are performed.

Reactive purge module 166 can be configured to purge assets from local storage resource 120 in response to detection of conditions pertaining to how much available storage capacity remains at local storage resource 120. Examples of such conditions include a critical storage condition (for example, less than two gigabytes of available storage capacity), a low storage condition (for example, less than five gigabytes of available storage capacity), or a suboptimal storage condition (for example, digital asset management application 160 is consuming more than a specified percentage of available local storage capacity). The specific assets which are purged may depend on the detected condition which triggered the reactive purge operation. For example, in cases where storage capacity is critical, both original and lossy assets are subject to purge, while in cases where storage availability is merely suboptimal, only original assets are subject to purge. The reactive purge operation selects assets for purging based on, among other things, the last time a given asset was accessed, with assets that were accessed in the distant past being queued for removal before assets that were recently accessed. In certain implementations a reactive purge operation can be performed continually until the condition which first triggered the operation no longer exists.

Referring still to the cloud-synchronized local storage management framework 1000 illustrated in FIG. 1, certain implementations of cloud storage gateway 300 include one or more software modules configured to implement functionality disclosed herein, as well as hardware capable of enabling such implementation. One example of implementing software is a cloud storage administration module 310 configured to manage interactions with cloud storage 350, including determining whether certain assets exist in cloud storage 350, storing assets in cloud storage 350, and retrieving existing assets from cloud storage 350. One example of implementing hardware is a communication module 340 that comprises any appropriate network chip or chipset which allows for wired and/or wireless communication via network 500 to one or more of the other components described herein.

Cloud storage 350 comprises the hardware that is used to store the data managed by cloud storage gateway 300. In one specific implementation, cloud storage 350 comprises a plurality of geographically distributed storage devices 350a, 350*b*, 350*c*, 350*d*, 350*e* that use any suitable technology for storing large quantities of digital data. Examples of such technologies include file servers that use semiconductor storage technology (such as dynamic random access memory or flash memory), magnetic hard disc storage technology, and/or optical disc storage technology. As will be appreciated in light of this disclosure, the techniques disclosed herein can be implemented without regard to the particular storage technology used to implement cloud storage 350, and therefore may also be implemented using any suitable existing or subsequently developed storage technology. Likewise, while only five storage devices are illustrated in FIG. 1, in general cloud storage 350 will often comprise tens, hundreds, thousands, or more storage devices. Many cloud-based storage resources introduce a degree of redundancy into the data storage scheme, and thus a given data record may be stored on a plurality of the storage devices.

The embodiments described herein can be implemented in various forms of hardware, software, firmware, or special purpose processors. For example, in one embodiment a non-transitory computer readable medium has instructions encoded thereon that, when executed by one or more processors, cause aspects of the cloud-synchronized local storage management workflows disclosed herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications, applets, or modules that are tangibly embodied on a memory device, and that can be executed by a computer having any suitable architecture. In one embodiment the systems described herein can be hosted on a given web site and implemented, for example, using JavaScript or another suitable browser-based technology.

The functionalities disclosed herein can optionally be incorporated into a variety of different software applications, including digital imaging applications, document viewer applications, operating systems, and content management systems. For example, a digital imaging application may be configured to purge assets from a local storage resource where it can be confirmed that such assets are also available at a cloud-based storage resource. This enables the digital imaging application to efficiently, intelligently, and transparently coordinate storage of a collection of digital assets between the local storage device and the cloud-based storage resource. The computer software applications disclosed herein may include a number of different modules, sub-modules, or other components of distinct functionality, and can provide input to, or receive information from, still other components and services. These modules can be used, for example, to communicate with input/output devices such as display 172, a touch sensitive surface, a printer, or any other suitable input/output device. Other components and functionalities not reflected in the illustrations will be apparent in light of this disclosure, and it will be appreciated that the present disclosure is not intended to be limited to any particular hardware or software configuration. Thus in other embodiments the example framework 1000 illustrated in FIG. 1 may include additional, fewer, or other subcomponents.

The aforementioned non-transitory computer readable medium may be any suitable medium for storing digital information, such as a hard drive, a server, a flash memory device, a random access memory device, or any suitable combination of the foregoing. In alternative embodiments, the components and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology: Proactive Purge

Figure 2:
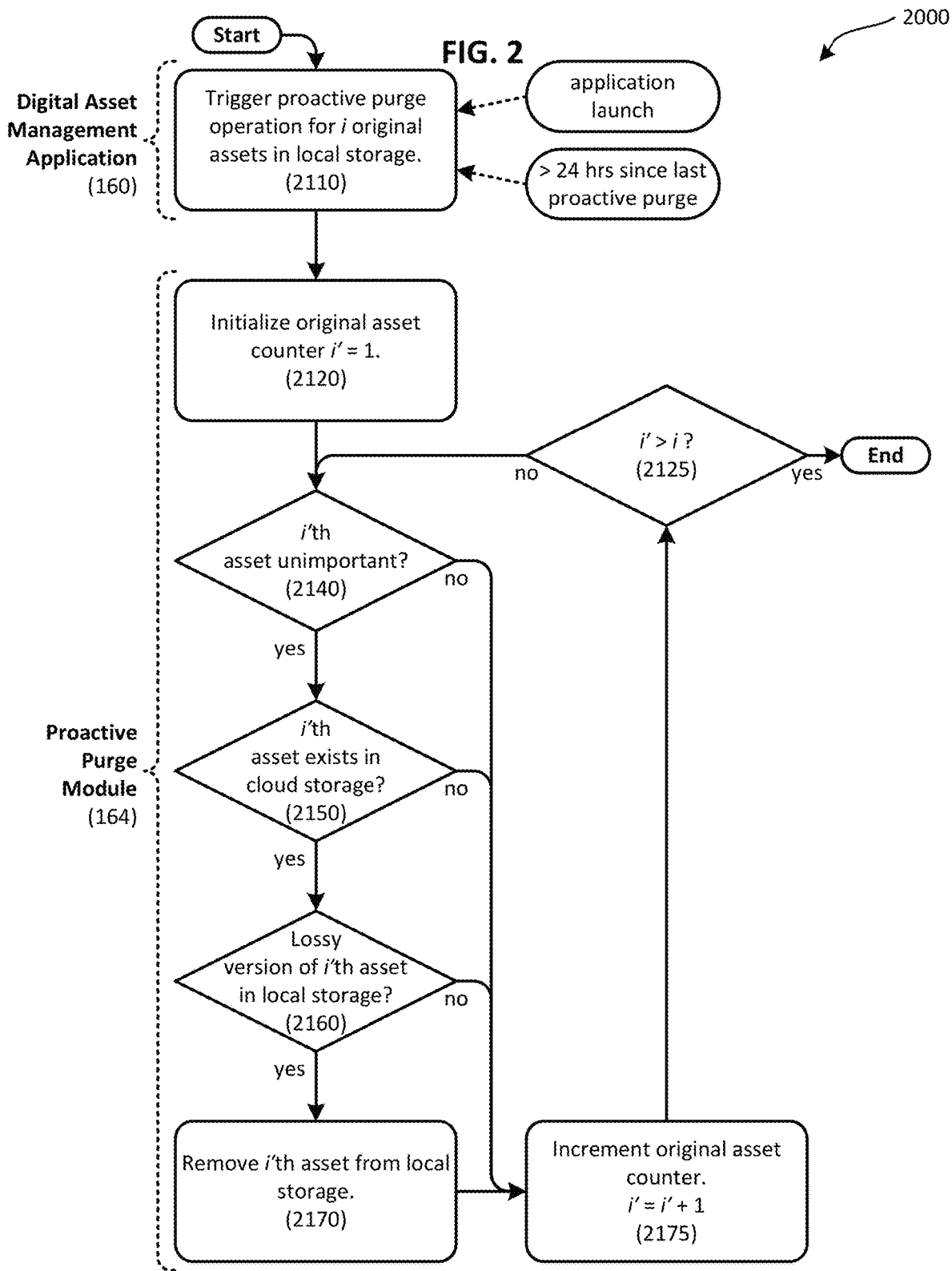
FIG. 2 is a flowchart illustrating an example technique for performing a periodic proactive purge of locally stored assets as part of a cloud-synchronized storage management system.

FIG. 2 is a flowchart illustrating an example proactive purge operation 2000 that removes assets from local storage resource 120 as part of a cloud-synchronized storage management system. As can be seen, operation 2000 includes a number of phases and sub-processes, the sequence of which may vary from one embodiment to another. However, when considered in the aggregate, these phases and sub-processes periodically remove from local storage resource 120 original assets which (a) are evaluated as being unimportant; (b) are also stored in cloud storage 350; and (c) have a corresponding locally-stored lossy version. Operation 2000 can be implemented, for example, using the system architecture illustrated in FIG. 1 and described herein. However other system architectures can be used in other embodiments, as will be apparent in light of this disclosure. To this end, the correlation of the various functionalities shown in FIG. 2 to the specific components illustrated in FIG. 1 is not intended to imply any structural or use limitations. Rather other embodiments may include, for example, varying degrees of integration wherein multiple functionalities are effectively performed by one system or module. For example, in an alternative embodiment a single module is used to perform both proactive and reactive purge operations. Thus other embodiments may have fewer or more modules depending on the granularity of implementation. Numerous variations and alternative configurations will be apparent in light of this disclosure.

Proactive purge operation 2000 is initiated when digital asset management application 160 detects that a certain trigger condition has been satisfied. In some cases proactive purge operation 2000 is triggered each time an application is launched, such as each time digital asset management application 160 is launched. Users may sometimes leave an application running indefinitely, so proactive purge operation 2000 may also be triggered periodically, such as at least once every hour, at least once every six hours, at least once every twelve hours, at least once every 24 hours, or at least once every week. Other time periods can be used in other embodiments. Thus in one particular implementation, proactive purge operation 2000 is invoked when digital asset management application 160 is initially launched, and then every 24 hours thereafter.

Regardless of the triggering event or condition, proactive purge operation 2000 is invoked with respect to a quantity i of original assets that are stored in local storage resource 120. See reference numeral 2110 in FIG. 2. In some cases the quantity i represents all of the original assets stored in local storage resource 120, while in alternative embodiments only a subset of such assets are subjected to the proactive purge operation 2000. To facilitate sequential processing of the i original assets in proactive purge operation 2000, proactive purge module 164 compares the fixed quantity i to an incrementing original asset counter i'. The incrementing original asset counter i' is initially set such that i'=1, and it increments as each of the i original assets is processed. See reference numeral 2120 in FIG. 2. Once i'>i, proactive purge operation 2000 is complete.

Proactive purge operation 2000 is designed to remove from local storage resource 120 certain original assets which are not "important" (that is, "unimportant") to the user. Therefore a determination is made with respect to whether the i'th original asset is important to the user. See reference numeral 2140 in FIG. 2. As used herein, any of a suitable number of factors may be considered in determining whether a particular asset is "important" or "unimportant". For example, in one implementation an asset is considered to be "important" if any of the following conditions are met: (a) the user has affirmatively indicated the asset as a "favorite", as a "pick", or as having another preferred status; (b) the user has rated the asset above a threshold rating, such as having at least four stars in a five-star rating framework; (c) the asset, including asset metadata and develop settings, has been modified within a certain time period, such as within the last 30 days; (d) the asset was imported into local storage resource 120 within a certain time period, such as within the last 30 days; (e) the asset was accessed within a certain time period, such as within the last 15 days; or (f) the user has affirmatively marked the asset for local use. Additional or alternative factors may be considered in other embodiments. As the foregoing list suggests, importance is typically indicated by user action or input, and thus such action or input may be received at any synchronized device through which a user accesses his/her collection of digital assets. Thus, for example, if a user indicates a particular photograph as a "favorite" using his/her smartphone, such indication will prevent that same photograph from being purged when proactive purge operation 2000 is invoked at the same user's desktop computer.

If the i'th original asset is considered to be important (that is, not unimportant), then it is not purged in proactive purge operation 2000. In this case, the original asset counter i' is incremented such that i'=+1. See reference numeral 2175 in FIG. 2. The incremented original asset counter i' is then compared to the total quantity of original assets i which are to be processed in proactive purge operation 2000. See reference numeral 2125 in FIG. 2. If i'≤i, then there are additional original assets that should be processed by proactive purge module 164, as disclosed herein and illustrated in FIG. 2. However, if i'>i, then all original assets have been processed and proactive purge operation 2000 is complete.

While importance is one factor that is considered in deciding whether an original asset should be purged in proactive purge operation 2000, it is not the only factor. For example, if the i'th original asset has not yet been synchronized to cloud storage 350, and therefore does not yet exist in cloud storage 350, such asset should not be purged from local storage resource 120. Thus a determination is made with respect to whether or not the i'th original asset exists in cloud storage 350. See reference numeral 2150 in FIG. 2. If the i'th original asset does not exist in cloud storage 350, then it is not purged in proactive purge operation 2000. In this case, the original asset counter i' is incremented such at i'=+1. See reference numeral 2175 in FIG. 2. The incremented original asset counter i' is then compared to the total quantity of original assets i which are to be processed in proactive purge operation 2000. See reference numeral 2125 in FIG. 2. If i'≤i, then there are additional original assets which should be processed by proactive purge module 164, as disclosed herein and illustrated in FIG. 2. However, if i'>i, then all original assets have been processed and proactive purge operation 2000 is complete.

When an original asset is only available at cloud storage 350 it can increase latency when a user attempts to access that asset. To mitigate this effect, it is desirable to retain a lossy version of a purged original asset in local storage resource 120. For example, this facilitates rapid generation of a thumbnail version of the asset which can be presented to a user who is browsing through his/her collection of assets. Thus in certain embodiments the local presence of a lossy version of a given original asset is another factor that should be considered in deciding whether to purge the given original asset from local storage resource 120. In such embodiments proactive purge operation 200 includes making a determination with respect to whether a lossy version of the i'th original asset exists in local storage resource 120. See reference numeral 2160 in FIG. 2. If a lossy version of the i'th original asset does not exist in local storage resource 120, then it is not purged in proactive purge operation 2000. In this case, the original asset counter i' is incremented such at i'=+1. See reference numeral 2175 in FIG. 2. The incremented original asset counter i' is then compared to the total quantity of original assets i which are to be processed in proactive purge operation 2000. See reference numeral 2125 in FIG. 2. If i'≤i, then there are additional original assets which should be processed by proactive purge module 164, as disclosed herein and illustrated in FIG. 2. However, if i'>i, then all original assets have been processed and proactive purge operation 2000 is complete.

As illustrated in FIG. 2, if the i'th original asset is not important, exists in cloud storage 350, and has a corresponding lossy version present in local storage resource 120, then the i'th original asset is removed from local storage resource 120. See reference numeral 2170. This advantageously reduces the extent to which the user's collection of digital assets consumes local storage resource 120 while still reducing the likelihood that purging the asset will adversely affect user experience. Once the i'th original asset is purged from local storage resource 120, the original asset counter i' is incremented such at i'=+1. See reference numeral 2175 in FIG. 2. The incremented original asset counter i' is then compared to the total quantity of original assets i which are to be processed in proactive purge operation 2000. See reference numeral 2125 in FIG. 2. If i'≤i, then there are additional original assets which should be processed by proactive purge module 164, as disclosed herein and illustrated in FIG. 2. However, if i'>i, then all original assets have been processed and proactive purge operation 2000 is complete.

Methodology: Reactive Purge

FIGS. 3A through 3G comprise a flowchart illustrating an example reactive purge operation 3000 that removes assets from local storage resource 120 as part of a cloud-synchronized storage management system. As can be seen, operation 3000 includes a number of phases and sub-processes, the sequence of which may vary from one embodiment to another. However, when considered in the aggregate, these phases and sub-processes periodically purge from local storage resource 120 original assets and/or lossy assets so as to free storage space while mitigating the extent to which such purging will adversely affect user experience. Operation 3000 can be implemented, for example, using the system architecture illustrated in FIG. 1 and described herein. However other system architectures can be used in other embodiments, as will be apparent in light of this disclosure. To this end, the correlation of the various functionalities shown in FIGS. 3A through 3G to the specific components illustrated in FIG. 1 is not intended to imply any structural or use limitations. Rather other embodiments may include, for example, varying degrees of integration wherein multiple functionalities are effectively performed by one system or module. For example, in an alternative embodiment a single module is used to perform both proactive and reactive purge operations. Thus other embodiments may have fewer or more modules depending on the granularity of implementation. Numerous variations and alternative configurations will be apparent in light of this disclosure.

Reactive purge operation 3000 is initiated when digital asset management application 160 detects that a certain triggering local storage condition has been satisfied. See reference numeral 3110 in FIG. 3A. In general, such triggering condition relates specifically to local storage resource 120, such as when available storage drops below certain threshold values, or when the locally stored assets are consuming more than a specified percentage of available local storage capacity. For example, in one embodiment the presence of less than two gigabytes of available storage at local storage resource 120 is considered a "critical" storage condition and the presence of less than five gigabytes of available storage at local storage resource 120 is considered to be a "low" storage condition. Likewise, when a user's digital assets consume more than a specified percentage of available storage capacity provided by local storage resource 120, this condition may be considered to be a "suboptimal" storage condition. For example, if local storage resource 120 is a one terabyte hard drive, if 400 GB are in use (excluding use by digital asset management application itself), and if the specified percentage has been set to 35%, then a suboptimal storage condition will exist when the locally-stored digital assets consume more than (1 TB-400 GB)×35%=210 GB. Thus the threshold for triggering the suboptimal storage condition may dynamically change as more or less of local storage resource 120 is dedicated to other uses unrelated to digital asset management application 160. Thus, in certain implementations reactive purge operation 3000 may be invoked even though digital asset management application 160 has not attempted to store additional assets in local storage resource 120. The specified percentage, also referred to as a "target local storage footprint", as well as the thresholds associated with the critical and low storage conditions described above, is not critical, and in other embodiments other values can be used. In certain embodiments at least some of these values can be user-defined, as will be described in turn. Table A lists example definitions for the storage conditions described herein, and also indicates which assets are considered for purge in reactive purge operation 3000.

TABLE A

Example definitions for selected storage conditions.

| Storage Condition | Example Definition | Example Assets Considered for Purge in Reactive Purge Operation |
|---|---|---|
| critical | <2 GB available locally | original assets<br>lossy assets |
| low | <5 GB available locally | original assets<br>lossy assets if Lite Mode is active |
| suboptimal | locally-stored assets consume > target local storage footprint (for example, >25% of available local storage) | original assets<br>lossy assets if Lite Mode is active<br>24-hour safe harbor applies if Lite Mode is inactive |

In some cases a user may set the target local storage footprint to 0%. In this case, digital asset management application 160 may operate in a mode intended to minimize use of local storage resource 120. Such mode is referred to herein as "Lite Mode". Operating in Lite Mode subjects additional assets to purging in reactive purge operation 3000, as will be described in turn. The user may deactivate Lite Mode by setting the target local storage footprint to a value other than 0%. Lite Mode offers on-demand synchronizing of assets with only limited use of local storage resource 120.

Thus in certain embodiments reactive purge module 166 makes a determination with respect to whether a critical storage condition has been detected. See reference numeral 3120 in FIG. 3A. If so, a "trigger condition" parameter is set to "critical". See reference numeral 3125 in FIG. 3A. Otherwise, reactive purge module 166 makes a determination with respect to whether a low storage condition has been detected. See reference numeral 3140 in FIG. 3A. If so, the trigger condition parameter is set to "low". See reference numeral 3145 in FIG. 3A. Otherwise, reactive purge module 166 makes a determination with respect to whether a suboptimal storage condition has been detected. See reference numeral 3150 in FIG. 3A. If so, the trigger condition parameter is set to "suboptimal". Otherwise, reactive purge operation 3000 is not performed. If any of the critical, low, or suboptimal storage conditions exist, then reactive purge operation 3000 is triggered. See reference numeral 3165 in FIG. 3A.

Regardless of the storage condition that triggered reactive purge operation 3000, a new listing of original assets in local storage resource 120 is generated. See reference numeral 3210 in FIG. 3B. One example of such a listing is conceptually illustrated in FIG. 4A. In particular, FIG. 4A illustrates a listing of assets 4100, each of which is identified by an asset identifier ("ID"), associated with a last access date/time, and further associated with an importance tag ("Imp't?") indicating whether or not the listed asset is deemed to be "important" to a user. In certain embodiments this listing is derived from, or forms a part of, asset index 124. At the outset, the original assets in this listing are marked as "unprocessed". See reference numeral 3220 in FIG. 3B. The listed original assets are ranked based on time of last access, with the least recently accessed original asset ranked highest. See reference numeral 3240 in FIG. 3B. One example of such a ranked listing is conceptually illustrated in FIG. 4B. In particular, FIG. 4B illustrates a ranked listing of assets 4200, wherein the least recently accessed asset is ranked highest.

In many cases, all original assets are subject to purge in reactive purge operation 3000. However, where the only detected storage condition is "suboptimal", and where Lite Mode is not active, original assets which the user has accessed within a certain "safe harbor" time period are exempt from purge. In some cases accessing a given asset at any device invokes this safe harbor, while in other cases only access from the particular local computing device 100 that hosts local storage resource 120 which is subject to reactive purge operation 3000 triggers the safe harbor. In one particular implementation the time period that triggers the safe harbor exemption is 24 hours, meaning that where the only detected storage condition is "suboptimal", and where Lite Mode is not active, original assets accessed within the last 24 hours are exempt from purge in reactive purge operation 3000. A safe harbor time period other than 24 hours can be used in alternative embodiments.

Figure 3B:
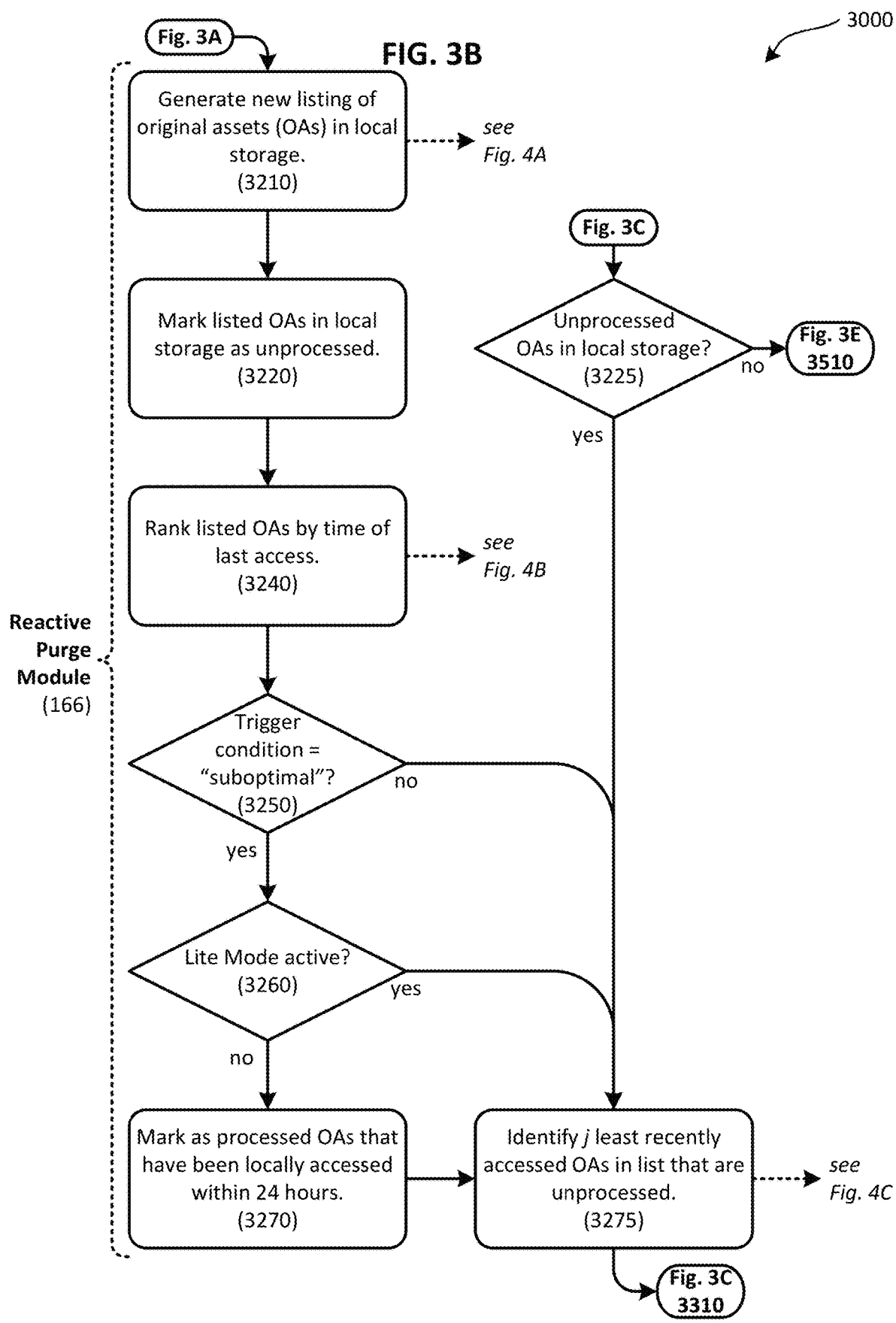

Thus, as illustrated in FIG. 3B, determinations are made with respect to whether the trigger condition is "suboptimal" (see reference numeral 3250 in FIG. 3B), and whether Lite Mode is active (see reference numeral 3260 in FIG. 3B). If the trigger condition is "suboptimal" and Lite Mode is not active, then all original assets that have been locally accessed within the last 24 hours are marked as "processed". See reference numeral 3270 in FIG. 3B. This shields such assets from removal during reactive purge operation 3000.

Once any original assets have been marked as processed pursuant to the aforementioned safe harbor time period, a subset of j least recently accessed unprocessed original assets in the list are identified, $1 \leq j$. See reference numeral 3275 in FIG. 3B. One example of such a subset is conceptually illustrated in FIG. 4C. In particular, FIG. 4C illustrates a ranked listing of assets 4300, wherein a subset of j=15 least recently accessed assets are identified. Where multiple subsets of the original assets are processed sequentially, each subset may contain a different quantity j original assets. For example, FIG. 4C illustrates an implementation wherein 20 assets are to be processed, and j=15 assets are identified in a first subset. In this case, a subsequent iteration of reactive purge operation 3000 may involve processing a second subset comprising j=5 assets.

The subset of j original assets are then primarily ranked by importance, with unimportant original assets being ranked higher than important original assets. See reference numeral 3310 in FIG. 3C. The subset of j original assets are then secondarily ranked based on time of last access, with the least recently accessed original assets ranked highest. See reference numeral 3320 in FIG. 3C. The result is a reordering of the j original assets that are ranked first by importance and second by time of last access. One example of such a dually-ranked subset of j assets is conceptually illustrated in FIG. 4D. In particular, FIG. 4D illustrates a ranked listing of assets 4400, wherein a subset of j=15 assets has been ranked first by importance and second by time of last access. To facilitate sequential processing of the j original assets in reactive purge operation 3000, reactive purge module 166 compares the fixed quantity j to an incrementing original asset counter j'. The incrementing original asset counter j' is initially set such that j'=1, and it increments as each of the j original assets is processed. See reference numeral 3340 in FIG. 3C. The j'=1st original asset corresponds to the highest ranked original asset in the aforementioned ranking that is ranked first on importance and second on time of last access.

Figure 3C:
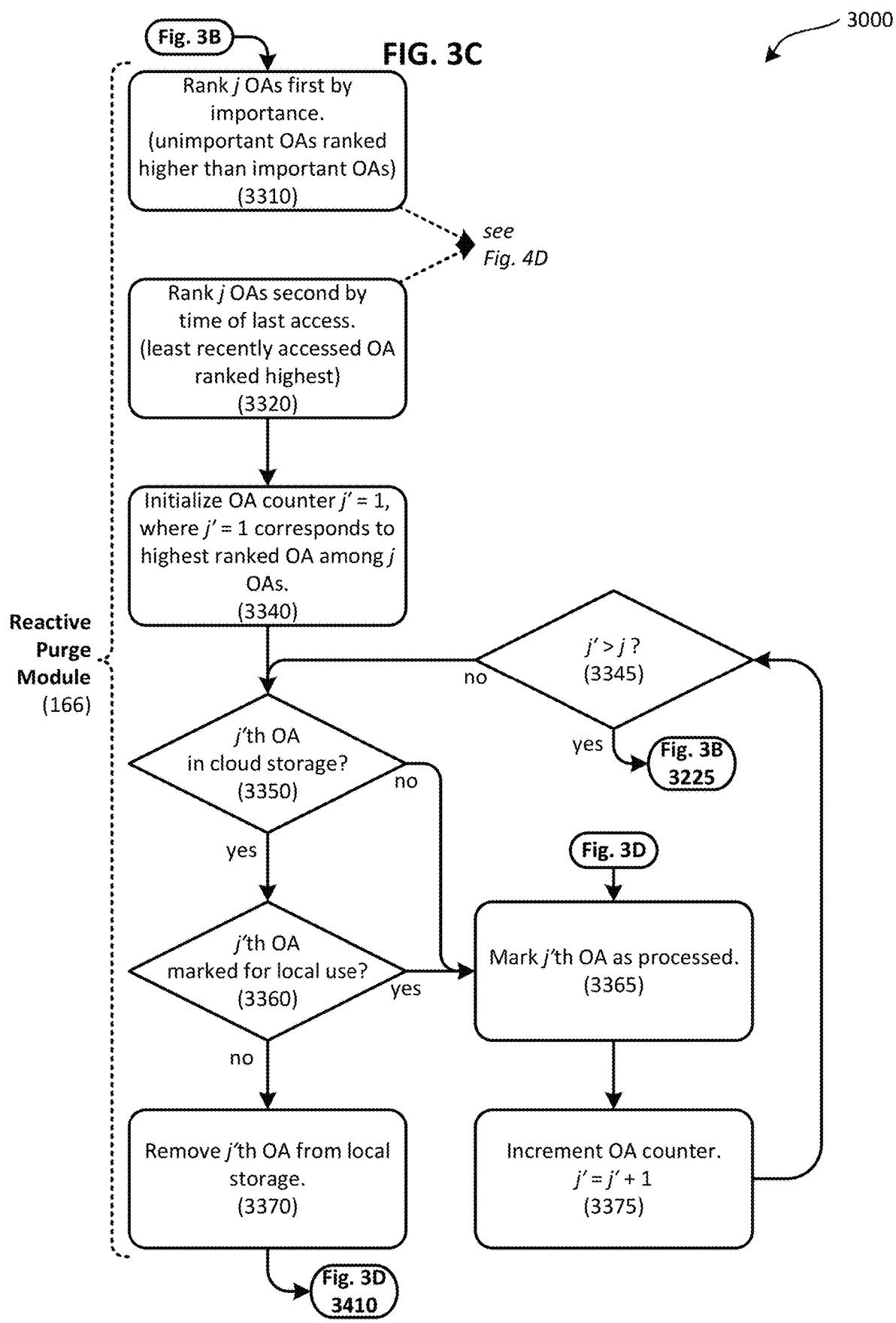

Reactive purge operation 3000 removes original assets from local storage resource 120 if such assets are already synchronized to cloud storage 350, and if such assets have not been marked for local use. Thus, as illustrated in FIG. 3C, determinations are made with respect to whether the j'th original asset already exists in cloud storage 350 (see reference numeral 3350 in FIG. 3C), and whether the j'th original asset has been marked for local use (see reference numeral 3360 in FIG. 3C). If the j'th original asset already exists in cloud storage 350 and has not been marked for local use, then it is removed from local storage resource 120. See reference numeral 3370 in FIG. 3C.

On the other hand, if the j'th original asset does not exist in cloud storage 350, or has been marked for local use, then it is not removed from local storage resource 120, and is marked as processed. See reference numeral 3365 in FIG. 3C. In this case, the original asset counter j' is incremented such that j'=j'+1. See reference numeral 3375 in FIG. 3C. The incremented original asset counter j' is then compared to j, which is the total quantity of original assets in the currently processed subset. See reference numeral 3345 in FIG. 3C. If j'≤j, then there are additional original assets in the subset that should be processed by proactive purge module 164, as disclosed herein and illustrated in FIG. 3C. However, if j'>j, then all original assets in the subset have been processed. In this case, it is determined whether additional unprocessed original assets exist in local storage resource 120. See reference numeral 3225 in FIG. 3B. If so, another subset of j least recently accessed unprocessed original assets in the list are identified, j≥1. See reference numeral 3275 in FIG. 3B. As noted above, where multiple subsets of the original assets are processed sequentially, each subset may contain a different quantity j of original assets. On the other hand, if no additional unprocessed original assets exist in local storage resource 120, subsequent processing of lossy assets is performed, if appropriate, as will be discussed in turn.

Returning to the situation where an original asset is removed from local storage resource 120 (see reference numeral 3370 in FIG. 3C), reactive purge module 166 is configured to evaluate whether such removal may have mitigated the local storage condition which originally triggered the reactive purge. In certain implementations, determinations are made with respect to whether the trigger condition was "critical" (see reference numeral 3410 in FIG. 3D) and whether the critical storage condition still exists (see reference numeral 3415 in FIG. 3D). If the trigger condition was "critical" and the critical storage condition no longer exists, then reactive purge operation 3000 restarts so that a determination can be made with respect to whether any other trigger conditions exist (for example, "low" or "suboptimal"). See reference numeral 3110 in FIG. 3A. On the other hand, if the trigger condition was "critical" and the critical storage condition still exists, then the j'th original asset is marked as processed and reactive purge operation 3000 proceeds as illustrated in FIG. 3C. See reference numeral 3365 in FIG. 3C.

If the trigger condition was not "critical", then in certain implementations determinations are made with respect to whether the trigger condition was "low" (see reference numeral 3420 in FIG. 3D) and whether the low storage condition still exists (see reference numeral 3425 in FIG. 3D). If the trigger condition was "low" and the low storage condition no longer exists, then reactive purge operation 3000 restarts so that a determination can be made with respect to whether any other trigger conditions exist (for example, "suboptimal"). See reference numeral 3110 in FIG. 3A. On the other hand, if the trigger condition was "low" and the low storage condition still exists, then the j'th original asset is marked as processed and reactive purge operation 3000 proceeds as illustrated in FIG. 3C. See reference numeral 3365 in FIG. 3C.

If the trigger condition was neither "critical" nor "low", then it must have been "suboptimal". In this case, it is determined whether the suboptimal storage condition still exists. See reference numeral 3440 in FIG. 3D. If it does, then the j'th original asset is marked as processed and reactive purge operation 3000 proceeds as illustrated in FIG. 3C. See reference numeral 3365 in FIG. 3C. On the other hand, if the suboptimal storage condition no longer exists then it is further determined whether a storage buffer has been satisfied. See reference numeral 3450 in FIG. 3D. In certain implementations once a suboptimal storage condition has been mitigated, additional assets are purged from local storage resource 120 so as to create a buffer between the target local storage footprint and the current amount of available storage. This reduces the likelihood that another reactive purge operation is immediately triggered upon mitigation of the suboptimal storage condition. In certain embodiments the buffer is 5 MB, 10 MB, 20 MB, 50 MB, 100 MB, 200 MB, 500 MB, or 1 GB. The size of the buffer is optionally user-configurable. If the storage buffer has been satisfied, reactive purge operation 3000 is complete. Otherwise, the j'th original asset is marked as processed and reactive purge operation 3000 proceeds as illustrated in FIG. 3C See reference numeral 3365 in FIG. 3C.

Figure 3E:
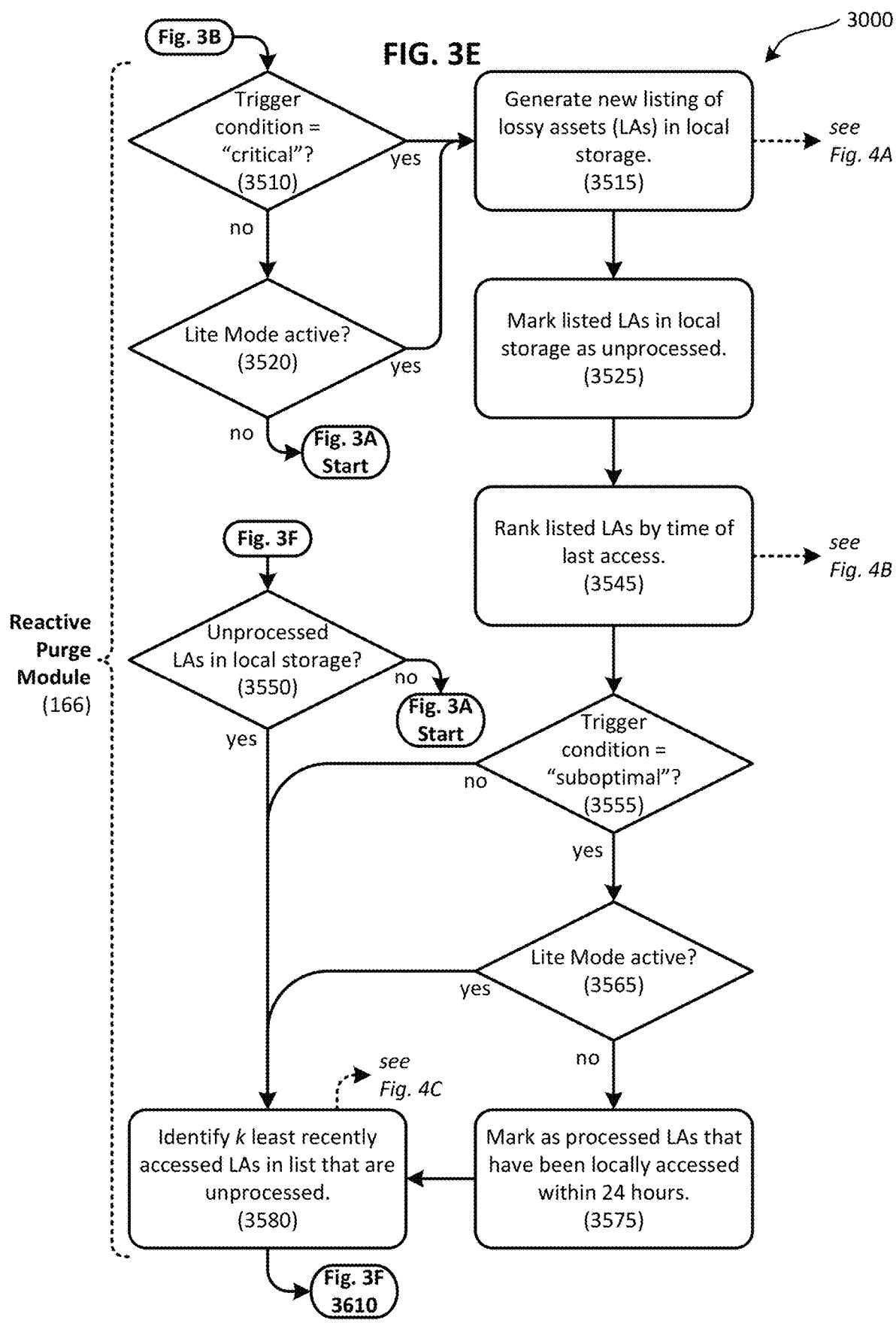

Returning to the situation where no unprocessed original assets exist in local storage (see reference numeral 3225 in FIG. 3B), reactive purge module 166 is configured to further process lossy assets in certain circumstances. Thus, in certain embodiments, such as illustrated in FIG. 3E, determinations are made with respect to whether the trigger condition is "critical" (see reference numeral 3510 in FIG. 3E), and whether Lite Mode is active (see reference numeral 3520 in FIG. 3E). If the trigger condition is not "critical" (that is, it is "low" or "suboptimal"), and if Lite Mode is not active, then lossy assets are not processed and reactive purge operation 3000 restarts so that a determination can be made with respect to whether any trigger conditions still exist. See reference numeral 3110 in FIG. 3A. On the other hand, if the trigger condition is "critical", or if Lite Mode is active, then reactive purge module 166 removes one or more lossy assets to further mitigate the detected storage condition.

Referring still to FIG. 3E, a new listing of lossy assets in local storage resource 120 is generated. See reference numeral 3515 in FIG. 3E. One example of such a listing is conceptually illustrated in FIG. 4A. In particular, FIG. 4A illustrates a listing of assets 4100, each of which is identified by an asset identifier ("ID"), is associated with a last access date/time, and is further associated with an importance tag ("Imp't?") indicating whether or not the listed asset is deemed to be "important" to a user. In certain embodiments this listing is derived from, or forms a part of, asset index 124. At the outset, the lossy assets in this listing are marked as "unprocessed". See reference numeral 3525 in FIG. 3E. The listed lossy assets are ranked based on time of last access, with the least recently accessed lossy asset ranked highest. See reference numeral 3545 in FIG. 3E. One example of such a ranked listing is conceptually illustrated in FIG. 4B. In particular, FIG. 4B illustrates a ranked listing of assets 4200, wherein the least recently accessed asset is ranked highest.

In many cases, all lossy assets are subject to purge in reactive purge operation 3000. However, where the only detected storage condition is "suboptimal", and where Lite Mode is not active, lossy assets which the user has accessed within a certain "safe harbor" time period are exempt from purge. In some cases accessing a given asset at any device invokes this safe harbor, while in other cases only access from the particular local computing device 100 that hosts local storage resource 120 which is subject to reactive purge operation 3000 triggers the safe harbor. In one particular implementation the time period that triggers the safe harbor exemption is 24 hours, meaning that where the only detected storage condition is "suboptimal", and where Lite Mode is not active, lossy assets accessed within the last 24 hours are exempt from purge in reactive purge operation 3000. A safe harbor time period other than 24 hours can be used in alternative embodiments.

Thus, as illustrated in FIG. 3E, determinations are made with respect to whether the trigger condition is "suboptimal" (see reference numeral 3555 in FIG. 3E), and whether Lite Mode is active (see reference numeral 3565 in FIG. 3E). If the trigger condition is "suboptimal" and Lite Mode is not active, then all lossy assets that have been locally accessed within the last 24 hours are marked as "processed". See reference numeral 3575 in FIG. 3E. This shields such assets from removal during reactive purge operation 3000.

Once any lossy assets have been marked as processed pursuant to the aforementioned safe harbor time period, a subset of k least recently accessed unprocessed lossy assets in the list are identified, 1≤k. See reference numeral 3580 in FIG. 3E. One example of such a subset is conceptually illustrated in FIG. 4C. In particular, FIG. 4C illustrates a ranked listing of assets 4300, wherein a subset of k=15 least recently accessed assets are identified. Where multiple subsets of the lossy assets are processed sequentially, each subset may contain a different quantity k lossy assets. For example, FIG. 4C illustrates an implementation wherein there are 20 assets to be processed, and k=15 assets are identified in a first subset. In this case, a subsequent iteration of reactive purge operation 3000 may involve processing a second subset comprising k=5 assets.

The subset of k lossy assets are then primarily ranked by importance, with unimportant lossy assets being ranked higher than important lossy assets. See reference numeral 3610 in FIG. 3F. The subset of k lossy assets are then secondarily ranked based on time of last access, with the least recently accessed lossy assets ranked highest. See reference numeral 3620 in FIG. 3F. The result is a reordering of the k lossy assets that are ranked first by importance and second by time of last access. One example of such a dually-ranked subset of k assets is conceptually illustrated in FIG. 4D. In particular, FIG. 4D illustrates a ranked listing of assets 4400, wherein a subset of k=15 assets has been ranked first by importance and second by time of last access. To facilitate sequential processing of the k lossy assets in reactive purge operation 3000, reactive purge module 166 compares the fixed quantity k to an incrementing lossy asset counter k'. The incrementing lossy asset counter k' is initially set such that k'=1, and it increments as each of the k lossy assets is processed. See reference numeral 3640 in FIG. 3F. The k'=1st lossy asset corresponds to the highest ranked lossy asset in the aforementioned ranking that is ranked first on importance and second on time of last access.

Reactive purge operation 3000 removes a lossy asset from local storage resource 120 if either the lossy asset or the corresponding original asset has already been synchronized to cloud storage 350, and if the lossy asset has not been marked for local use. Thus, as illustrated in FIG. 3F, determinations are made with respect to whether the k'th lossy asset (or an original asset corresponding to the k'th lossy asset) already exists in cloud storage 350 (see reference numeral 3650 in FIG. 3F), and whether the k'th lossy asset has been marked for local use (see reference numeral 3660 in FIG. 3F). If the k'th lossy asset (or an original asset corresponding to the k'th lossy asset) already exists in cloud storage 350 and has not been marked for local use, then it is removed from local storage resource 120. See reference numeral 3670 in FIG. 3F. In cases where a lossy asset does not exist in cloud storage 350, but a corresponding original asset does, it is not computationally burdensome to later regenerate the lossy asset if necessary.

On the other hand, if the k'th lossy asset (or an original asset corresponding to the k'th lossy asset) does not exist in cloud storage 350, or has been marked for local use, then it is not removed from local storage resource 120, and is marked as processed. See reference numeral 3665 in FIG. 3F. In this case, the lossy asset counter k' is incremented such that k'=k'+1. See reference numeral 3675 in FIG. 3F. The incremented lossy asset counter k' is then compared to k, which is the total quantity of lossy assets in the currently processed subset. See reference numeral 3645 in FIG. 3F. If k'≤k, then there are additional lossy assets in the subset that should be processed by proactive purge module 164, as disclosed herein and illustrated in FIG. 3F. However, if k'>k, then all lossy assets in the subset have been processed. In this case, it is determined whether additional unprocessed lossy assets exist in local storage resource 120. See reference numeral 3550 in FIG. 3E. If so, another subset of k least recently accessed unprocessed lossy assets in the list are identified, k≥1. See reference numeral 3580 in FIG. 3E. As noted above, where multiple subsets of the lossy assets are processed sequentially, each subset may contain a different quantity k of lossy assets. On the other hand, if no additional unprocessed lossy assets exist in local storage resource 120, then reactive purge operation 3000 restarts so that a determination can be made with respect to whether any trigger conditions still exist.

Returning to the situation where a lossy asset is removed from local storage resource 120 (see reference numeral 3670 in FIG. 3F), reactive purge module 166 is configured to evaluate whether such removal may have mitigated the local storage condition which originally triggered the reactive purge. In certain implementations, determinations are made with respect to whether the trigger condition was "critical" (see reference numeral 3710 in FIG. 3G) and whether the critical storage condition still exists (see reference numeral 3715 in FIG. 3G). If the trigger condition was "critical" and the critical storage condition no longer exists, then reactive purge operation 3000 restarts so that a determination can be made with respect to whether any other trigger conditions exist (for example, "low" or "suboptimal"). See reference numeral 3110 in FIG. 3A. On the other hand, if the trigger condition was "critical" and the critical storage condition still exists, then the k'th lossy asset is marked as processed and reactive purge operation 3000 proceeds as illustrated in FIG. 3F. See reference numeral 3665 in FIG. 3F.

If the trigger condition was not "critical", then in certain implementations determinations are made with respect to whether the trigger condition was "low" (see reference numeral 3720 in FIG. 3G) and whether the low storage condition still exists (see reference numeral 3725 in FIG. 3G). If the trigger condition was "low" and the low storage condition no longer exists, then reactive purge operation 3000 restarts so that a determination can be made with respect to whether any other trigger conditions exist (for example, "suboptimal"). See reference numeral 3110 in FIG. 3A. On the other hand, if the trigger condition was "low" and the low storage condition still exists, then the k'th lossy asset is marked as processed and reactive purge operation 3000 proceeds as illustrated in FIG. 3F. See reference numeral 3665 in FIG. 3F.

If the trigger condition was neither "critical" nor "low", then it must have been "suboptimal". In this case, it is determined whether the suboptimal storage condition still exists. See reference numeral 3740 in FIG. 3G. If it does, then the k'th lossy asset is marked as processed and reactive purge operation 3000 proceeds as illustrated in FIG. 3F. See reference numeral 3665 in FIG. 3F. On the other hand, if the suboptimal storage condition no longer exists then it is further determined whether a storage buffer has been satisfied. See reference numeral 3750 in FIG. 3F. In certain implementations once a suboptimal storage condition has been mitigated, additional assets are purged from local storage resource 120 so as to create a buffer between the target local storage footprint and the current amount of available storage. This reduces the likelihood that another reactive purge operation is immediately triggered upon mitigation of the suboptimal storage condition. In certain embodiments the buffer is 5 MB, 10 MB, 20 MB, 50 MB, 100 MB, 200 MB, 500 MB, or 1 GB. The size of the buffer is optionally user-configurable. If the storage buffer has been satisfied, reactive purge operation 3000 is complete. Otherwise, the k'th lossy asset is marked as processed and reactive purge operation 3000 proceeds as illustrated in FIG. 3F. See reference numeral 3665 in FIG. 3F.

User Interface

Figure 5:
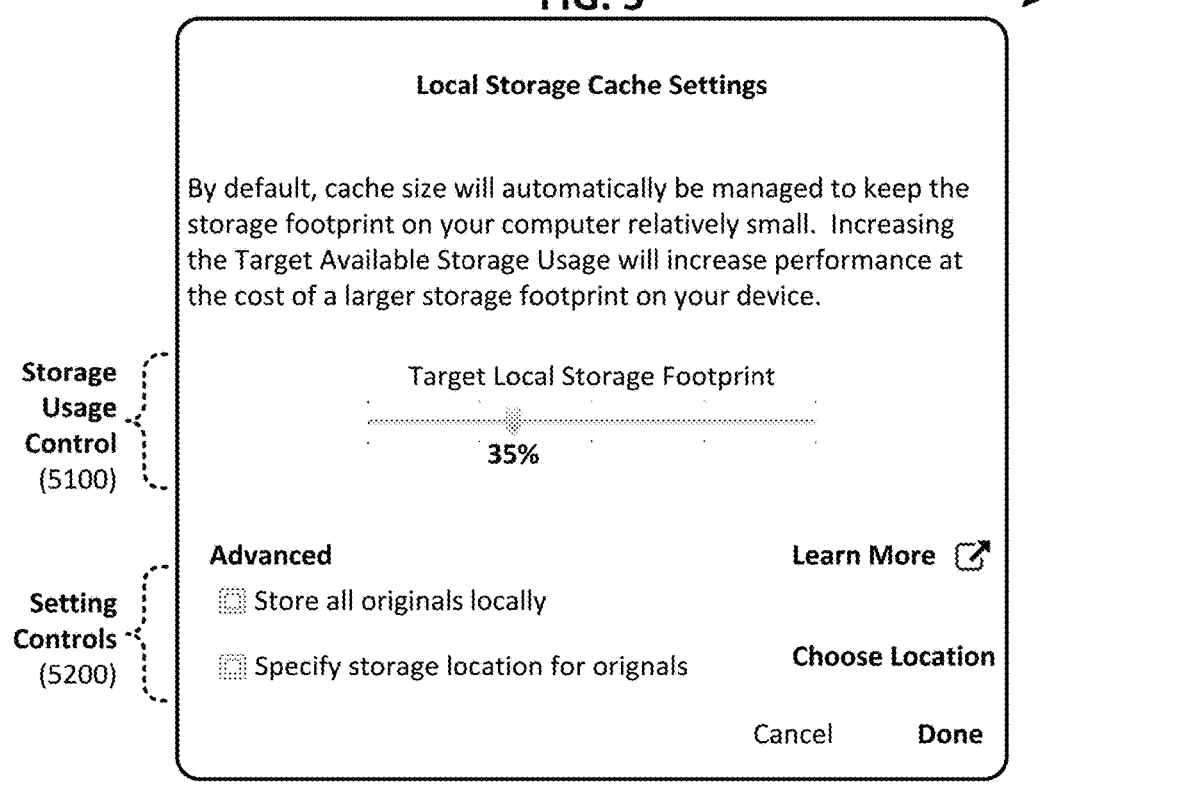
FIG. 5 is a screenshot of an example user interface that can be used to manipulate how a cloud-synchronized local storage management system coordinates storage of digital assets between a local storage resource and a cloud-based storage resource.

FIG. 5 is a screenshot of an example user interface 5000 that can be used to manipulate how a cloud-synchronized local storage management system coordinates storage of digital assets between local storage resource 120 and cloud storage 350. In certain embodiments user interface 5000 is generated by user interface module 162 that forms part of digital asset management application 160. User interface 5000 provides a user with control over certain aspects of the proactive and reactive purge operations, and described herein. For example, user interface 5000 includes a storage usage control 5100 that allows a user to set the "target local storage footprint" which is used to trigger the suboptimal storage condition. In certain implementations storage usage control 5100 comprises a slider user interface element that can be used to define the footprint as a specified percentage of available storage at local storage resource 120. For example, if local storage resource 120 is a one terabyte hard drive, if 400 GB are in use (excluding use by digital asset management application itself), and if the specified percentage has been set to 35%, then a suboptimal storage condition will exist when the locally-stored digital assets consume more than (1 TB-400 GB)×35%=210 GB. Other types of user interface elements can be used to set the target local storage footprint in other embodiments. In certain implementations storage usage control 5100 can also be used to set the thresholds for triggering a critical storage condition and/or a low storage condition. Such thresholds may be set as absolute values, such as at 2 GB and 5 GB, respectively. These settings can be applied to a particular local computing device 100, or can be configured to apply to all local computing devices associated with a particular user. In general, storage usage control 5100 allows a user to tune local disk usage to his/her unique needs.

In some cases, storage usage control 5100 can also be used to activate Lite Mode. In particular, Lite Mode can be activated when the target local storage footprint is set to 0%. The causes reactive purge operation 3000 to minimize the amount of local storage resource 120 that is used to store a user's collection of digital assets. Cloud storage 350 is leveraged as much as possible in this case. Lite Mode can be deactivated by setting the target local storage footprint to a value greater than 0%.

User interface 5000 also optionally includes other configuration setting controls 5200, such as a setting that forces all original assets to be stored locally. This would effectively suspend the proactive and reactive purge operations. In some implementations a user can define a specific location in local storage resource 120 where locally-cached assets are stored. This provides the user with a degree of control over where his/her assets reside locally. It also makes it easy for the user to change such storage location as desired. In one implementation digital asset management application 160 tracks each locally-stored asset using a path that is relative to a GUID associated with the logical volume on which the asset is stored. This advantageously enables a user to modify volume names and drive letters without affecting system operability, thus making it easy to move and administer cloud-synchronized local storage resources. In applications where a user specifies an external volume that may periodically be offline, such as a portable disk or thumb drive, digital asset management application 160 can be configured to use a temporary cache on local storage resource 120 until the external volume is reconnected.

Further Example Embodiments

Numerous variations and configurations will be apparent in light of this disclosure. For instance, one example embodiment provides a computer-implemented asset management method that comprises providing a digital asset management application that is executable on a local computing device. The digital asset management application is configured to communicate with a local storage resource and a cloud storage resource. The method further comprises accessing an index that lists digital assets which are stored in the local storage resource. The index indicates an importance and a last access timestamp for at least a portion of the listed digital assets. The method further comprises invoking a proactive purge operation at a specified time. The proactive purge operation causes a first digital asset to be removed from the local storage resource based on an importance, indicated in the index, that is associated with the first digital asset. The method further comprises invoking a reactive purge operation in response to a storage condition associated with the local storage resource. The reactive purge operation causes a second digital asset to be removed from the local storage resource based on an importance and a last access timestamp, indicated in the index, that is associated with the second digital asset. In some cases the storage condition occurs when the local storage resource has less than a specified quantity of available storage. In some cases the storage condition occurs when a specified proportion of available storage provided by the local storage resource is dedicated to hosting assets managed by the digital asset management application. In some cases (a) the storage condition occurs when a specified proportion of available storage provided by the local storage resource is dedicated to hosting assets managed by the digital asset management application; and (b) digital assets accessed within a specified time period of when the reactive purge operation is invoked are exempt from removal in the reactive purge operation. In some cases the proactive purge operation is invoked in response to launching the digital asset management application. In some cases the proactive purge operation is invoked in response to a designated time elapsing since a previous invocation of the proactive purge operation. In some cases at least one of the last access timestamps includes a date and a time. In some cases (a) the listed digital assets stored in the local storage resource include a plurality of original assets and a corresponding plurality of lossy assets; (b) each of the lossy assets represents a lower fidelity version of the corresponding original asset; (c) both original assets and lossy assets are removed from the local storage resource during the reactive purge operation; and (d) original assets are removed from the local storage resource before lossy assets are removed from the local storage resource.

Another example embodiment provides a cloud-synchronized local storage management system that comprises a memory. The system further comprises a processor that is coupled to, and capable of executing instructions stored in, the memory. The system further comprises a local storage resource having stored therein a collection of digital assets and an asset index that lists at least a portion of the digital assets. The asset index indicates an importance and a last access timestamp for at least a portion of the listed digital assets. The system further comprises a proactive purge module that is stored in the memory and that comprises means for invoking a proactive purge operation at a specified time. The proactive purge operation causes a first digital asset to be removed from the local storage resource based on an importance, indicated in the asset index, that is associated with the first digital asset. The system further comprises a reactive purge module that is stored in the memory and that comprises means for invoking a reactive purge operation in response to a storage condition associated with the local storage resource. The reactive purge operation causes a second digital asset to be removed from the local storage resource based on an importance and a last access timestamp, indicated in the asset index, that is associated with the second digital asset. In some cases (a) the collection of digital assets stored in the local storage resource includes a plurality of original assets and a corresponding plurality of lossy assets; and (b) each of the lossy assets represents a lower fidelity version of the corresponding original asset. In some cases (a) the collection of digital assets stored in the local storage resource includes a plurality of original assets and a corresponding plurality of lossy assets; (b) each of the lossy assets represents a lower fidelity version of the corresponding original asset; and (c) both original assets and lossy assets are removed from the local storage resource during the reactive purge operation. In some cases the system further comprises a user interface module configured to receive a user-defined target local storage footprint that defines a specified proportion of available storage provided by the local storage resource that is dedicated to hosting the collection of digital assets, wherein the storage condition is triggered when the target local storage footprint is surpassed. In some cases the reactive purge operation comprises ranking a subset of the digital assets listed in the asset index based on the last access timestamps of the ranked subset of digital assets. In some cases the reactive purge operation comprises dually ranking a subset of the digital assets listed in the asset index based first on the importance, and second on the last access timestamps, of the ranked subset of digital assets.

Another example embodiment provides a non-transitory computer readable medium encoded with instructions that, when executed by one or more processors, cause a cloud-synchronized local storage management process to be carried out. The process comprises providing a digital asset management application that is executing on a local computing device. The digital asset management application is in communication with a local storage resource and a cloud storage resource. The process further comprises accessing an index that lists digital assets which are stored in the local storage resource. The index indicates an importance and a last access timestamp for at least a portion of the listed digital assets. The process further comprises invoking a proactive purge operation at a specified time. The proactive purge operation causes a first digital asset to be removed from the local storage resource based on an importance, indicated in the index, that is associated with the first digital asset. The process further comprises invoking a reactive purge operation in response to a storage condition associated with the local storage resource. The reactive purge operation causes a second digital asset to be removed from the local storage resource based on an importance and a last access timestamp, indicated in the index, that is associated with the second digital asset. In some cases (a) the listed digital assets stored in the local storage resource include a plurality of original assets and a corresponding plurality of lossy assets; (b) each of the lossy assets represents a lower fidelity version of the corresponding original asset; (c) when the reactive purge operation is invoked in response to a critical storage condition that is triggered by less than a relatively lower threshold quantity of available storage existing at the local storage resource, both original assets and lossy assets are removed from the local storage resource; and (d) when the reactive purge operation is invoked in response to a low storage condition that is triggered by less than a relatively higher threshold quantity of available storage existing at the local storage resource, only original assets are removed from the local storage resource. In some cases the index further indicates a storage location for the listed digital assets, wherein the storage location refers to a global unique identifier for a device on which a given digital asset is stored. In some cases (a) the first digital asset that is removed from the local storage resource is an original asset; (b) the first digital asset exists in the cloud storage resource; and (c) a lossy version of the first digital asset exists in the local storage resource. In some cases the process further comprises determining the importance of at least a portion of digital assets stored in the local storage resource. In some cases the process further comprises determining an importance for a particular digital asset stored in the local storage resource based on a factor selected from a group consisting of a user selection, a user ranking, a last modification time, an time of importation into local storage resource, and a time of last access.

The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

What is claimed is:

1. A computer-implemented asset management method that comprises:
   providing a digital asset management application that is executable on a local computing device, wherein the digital asset management application is configured to communicate with a local storage resource and a cloud storage resource;
   accessing an index that lists digital assets which are stored in the local storage resource, wherein the index indicates an importance and a last access timestamp for at least a portion of the listed digital assets, wherein the listed digital assets stored in the local storage resource include a plurality of original assets and a corresponding plurality of lossy assets, and wherein each of the lossy assets represents a lower fidelity version of the corresponding original asset;
   invoking a proactive purge operation at a specified time, wherein the proactive purge operation causes a first digital asset to be removed from the local storage resource based on an importance, indicated in the index, that is associated with the first digital asset; and
   invoking a reactive purge operation in response to a storage condition associated with the local storage resource, wherein the reactive purge operation causes a plurality of digital assets to be removed from the local storage resource, wherein the plurality of digital assets removed in the reactive purge operation are selected for removal based on dually ranking the digital assets based first on an importance and second on a last access timestamp of such assets, as indicated in the index,
   wherein when the reactive purge operation is invoked in response to a critical storage condition that is triggered by less than a relatively lower threshold quantity of available storage existing at the local storage resource, both original assets and lossy assets are removed from the local storage resource;
   wherein when the reactive purge operation is invoked in response to a low storage condition that is triggered by less than a relatively higher threshold quantity of available storage existing at the local storage resource, only one or more original assets are removed from the local storage resource, without removing lossy assets; and
   wherein the reactive purge operation is invoked in response to the critical storage condition, and then if the low storage condition remains, the reactive purge operation invoked in response to the critical storage condition is followed by invocation of the reactive purge operation in response to the low storage condition.

2. The method of claim 1, wherein the storage condition occurs when a specified proportion of available storage provided by the local storage resource is dedicated to hosting assets managed by the digital asset management application.

3. The method of claim 1, wherein:
   the storage condition occurs when a specified proportion of available storage provided by the local storage resource is dedicated to hosting assets managed by the digital asset management application; and
   digital assets accessed within a specified time period of when the reactive purge operation is invoked are exempt from removal in the reactive purge operation.

4. The method of claim 1, wherein the proactive purge operation is invoked in response to launching the digital asset management application.

5. The method of claim 1, wherein the proactive purge operation is invoked in response to a designated time elapsing since a previous invocation of the proactive purge operation.

6. The method of claim 1, wherein at least one of the last access timestamps includes a date and a time.

7. The method of claim 1, wherein during the critical storage condition, original assets are removed from the local storage resource before lossy assets are removed from the local storage resource.

8. A cloud-synchronized local storage management system that comprises:
   a memory;
   a processor that is coupled to, and capable of executing instructions stored in, the memory;
   a local storage resource having stored therein a collection of digital assets and an asset index that lists at least a portion of the digital assets, wherein the asset index indicates an importance and a last access timestamp for at least a portion of the listed digital assets;
   a proactive purge module that is stored in the memory and that comprises means for invoking a proactive purge operation at a specified time, wherein the proactive purge operation defines a first subset of the digital assets and causes digital assets in the first subset to be removed from the local storage resource, wherein digital assets are included in the first subset based on the importance indicated in the asset index, and wherein the last access timestamps are not considered in defining the first subset of digital assets; and
   a reactive purge module that is stored in the memory and that comprises means for invoking a reactive purge operation in response to a storage condition associated with the local storage resource, wherein the reactive purge operation defines a second subset of the digital assets and causes digital assets in the second subset to be removed from the local storage resource, wherein digital assets are included in the second subset based on both (a) the importance indicated in the asset index and (b) the last access timestamps indicated in the asset index.

9. The cloud-synchronized local storage management system of claim 8, wherein:
the collection of digital assets stored in the local storage resource includes a plurality of original assets and a corresponding plurality of lossy assets; and
each of the lossy assets represents a lower fidelity version of the corresponding original asset.

10. The cloud-synchronized local storage management system of claim 8, wherein
the collection of digital assets stored in the local storage resource includes a plurality of original assets and a corresponding plurality of lossy assets;
each of the lossy assets represents a lower fidelity version of the corresponding original asset; and
both original assets and lossy assets are removed from the local storage resource during the reactive purge operation.

11. The cloud-synchronized local storage management system of claim 8, further comprising a user interface module configured to receive a user-defined target local storage footprint that defines a specified proportion of available storage provided by the local storage resource that is dedicated to hosting the collection of digital assets, wherein the storage condition is triggered when the target local storage footprint is surpassed.

12. The cloud-synchronized local storage management system of claim 8, wherein the reactive purge operation comprises ranking the second subset of the digital assets based on the last access timestamps of the ranked second subset of digital assets.

13. The cloud-synchronized local storage management system of claim 8, wherein the reactive purge operation comprises dually ranking the second subset of the digital assets based first on the importance, and second on the last access timestamps, of the ranked second subset of digital assets.

14. A non-transitory computer readable medium encoded with instructions that, when executed by one or more processors, cause a cloud-synchronized local storage management process to be carried out, the process comprising:
providing a digital asset management application that is executing on a local computing device, wherein the digital asset management application is in communication with a local storage resource and a cloud storage resource;
accessing an index that lists digital assets which are stored in the local storage resource, wherein the index indicates an importance and a last access timestamp for at least a portion of the listed digital assets, wherein the local storage stores:
(i) first digital content comprising digital content used by the digital asset management application, the first digital content including the digital assets that are managed by the digital asset management application and are listed in the index, and
(ii) second digital content that is separate from the first digital content;
invoking a proactive purge operation at a specified time, wherein the proactive purge operation causes a first digital asset to be removed from the local storage resource based on an importance, indicated in the index, that is associated with the first digital asset; and
invoking a reactive purge operation in response to a storage condition associated with the local storage resource, wherein the reactive purge operation causes a second digital asset to be removed from the local storage resource based on an importance and a last access timestamp, indicated in the index, that is associated with the second digital asset,
wherein the storage condition is triggered when an amount of the local storage resource consumed by the listed digital assets exceeds a specific percentage of an available storage capacity of the local storage resource, and wherein the available storage capacity is based on a difference between (i) a total storage capacity of the local storage resource and (ii) the second digital content.

15. The non-transitory computer readable medium of claim 14, wherein:
the listed digital assets stored in the local storage resource include a plurality of original assets and a corresponding plurality of lossy assets;
each of the lossy assets represents a lower fidelity version of the corresponding original asset;
when the reactive purge operation is invoked in response to a critical storage condition that is triggered by less than a relatively lower threshold quantity of available storage existing at the local storage resource, both original assets and lossy assets are removed from the local storage resource; and
when the reactive purge operation is invoked in response to a low storage condition that is triggered by less than a relatively higher threshold quantity of available storage existing at the local storage resource, only original assets are removed from the local storage resource.

16. The non-transitory computer readable medium of claim 14, wherein the index further indicates a storage location for the listed digital assets, wherein the storage location refers to a global unique identifier for a device on which a given digital asset is stored.

17. The non-transitory computer readable medium of claim 14, wherein:
the first digital asset that is removed from the local storage resource is an original asset;
the first digital asset exists in the cloud storage resource; and
a lossy version of the first digital asset exists in the local storage resource.

18. The non-transitory computer readable medium of claim 14, wherein the process further comprises determining an importance for a particular digital asset stored in the local storage resource based on a factor selected from a group consisting of a user selection, a user ranking, a last modification time, an time of importation into local storage resource, and a time of last access.

19. The cloud-synchronized local storage management system of claim 8, wherein:
the collection of digital assets stored in the local storage resource includes a plurality of original assets and a corresponding plurality of lossy assets;
the reactive purge operation selects, in the second subset of the digital assets, one or more original assets and one or more lossy assets, in response to a first storage conditions invoking the reactive purge; and
the reactive purge operation selects, in the second subset of the digital assets, one or more original assets, without selecting any lossy assets, in response to a second storage conditions invoking the reactive purge.

* * * * *